United States Patent [19]

Gillham et al.

[11] Patent Number: 5,067,787
[45] Date of Patent: Nov. 26, 1991

[54] ELECTRO-OPTICAL CONVERTER

[75] Inventors: Frederick J. Gillham, Westborough; David W. Stowe, Medford, both of Mass.

[73] Assignee: Aster Corporation, Milford, Mass.
[21] Appl. No.: 342,448
[22] PCT Filed: May 23, 1988
[86] PCT No.: PCT/US88/01705
    § 371 Date: Jan. 23, 1989
    § 102(e) Date: Jan. 23, 1989
[87] PCT Pub. No.: WO88/09517
    PCT Pub. Date: Dec. 1, 1988
[51] Int. Cl.⁵ .............................................. G02B 6/28
[52] U.S. Cl. .................................... 385/50; 385/24
[58] Field of Search ...................... 350/96.15, 96.16; 372/12; 357/19, 18

[56] References Cited

U.S. PATENT DOCUMENTS

| | | | |
|---|---|---|---|
| 3,896,402 | 7/1975 | Jackson | 333/73 W |
| 4,019,051 | 4/1977 | Miller | 350/96.15 |
| 4,054,366 | 10/1977 | Barnoski et al. | 350/96.15 |
| 4,165,150 | 8/1979 | Duck et al. | 350/96.15 |
| 4,216,486 | 8/1980 | Geddes | 357/19 |
| 4,268,113 | 5/1981 | Noel | 350/96.20 |
| 4,330,170 | 5/1982 | Johnson et al. | 350/96.16 |
| 4,399,453 | 8/1983 | Berg et al. | 357/81 |
| 4,474,431 | 10/1984 | Bricheno | 350/96.15 |
| 4,482,203 | 11/1984 | Stowe et al. | 350/96.15 |
| 4,536,058 | 8/1985 | Shaw et al. | 350/96.15 X |
| 4,556,279 | 12/1985 | Shaw et al. | 350/96.15 X |
| 4,596,051 | 6/1986 | Feldman | 455/614 |
| 4,601,541 | 7/1986 | Shaw et al. | 350/96.15 X |
| 4,611,886 | 9/1986 | Cline et al. | 350/96.20 |
| 4,625,333 | 11/1986 | Takezawa et al. | 350/96.20 X |
| 4,636,029 | 1/1987 | Johansson et al. | 350/96.16 |
| 4,639,075 | 1/1987 | Salour et al. | 350/96.16 |
| 4,650,285 | 3/1987 | Stevenson | 350/320 |
| 4,666,541 | 5/1987 | LeNoane et al. | 156/158 |
| 4,681,395 | 7/1987 | Lindsay et al. | 350/96.16 |
| 4,691,386 | 9/1987 | Eumurian et al. | 455/607 |
| 4,704,741 | 8/1987 | Shikada | 455/607 |
| 4,725,117 | 2/1988 | Ellis | 350/96.20 |
| 4,770,483 | 9/1988 | Ridgway | 350/96.16 X |
| 4,776,660 | 10/1988 | Mahlein et al. | 350/96.16 |
| 4,787,701 | 11/1988 | Stenger et al. | 350/96.21 |
| 4,789,213 | 12/1988 | Heywang et al. | 350/96.15 |
| 4,844,573 | 7/1989 | Gillham et al. | 350/96.16 |

FOREIGN PATENT DOCUMENTS

| | | |
|---|---|---|
| 2126749 | 3/1984 | Fed. Rep. of Germany . |
| 3326406 | 2/1985 | Fed. Rep. of Germany . |
| 3601102A | 7/1987 | Fed. Rep. of Germany . |
| 59-23305 | 2/1984 | Japan . |
| 59-198419 | 11/1984 | Japan . |
| 60-140208 | 7/1985 | Japan . |
| 61-273508 | 3/1986 | Japan . |

OTHER PUBLICATIONS

Drake, Low Reflectence Terminations and Connections for Duplex Fiber—Optic Telecommunications Links, Applied Optics, vol. 20, No. 9, May 1, 1981, pp. 1640–1644 IFIG. 1).

Primary Examiner—John D. Lee
Assistant Examiner—Phan T. Heartney
Attorney, Agent, or Firm—Fish & Richardson

[57] ABSTRACT

An electro-optical converter has at least three optical or electrical ports at least one of which is optical and one of which is electrical. The converter includes an essentially rigid support, a fiber-optic lateral coupler secured to the support including at least two length-wise continuous optical fibers juxtaposed along a portion of their length to provide lateral transfer of optical energy therebetween, and an electro-optical device also secured to the support in close relationship to the coupler. The device has at least one optical port and at least one electrical port. One of the coupler fibers communicates within the converter with the optical port of the electro-optical device, to serve as an internal signal link therebetween. The length of the link between coupler and electro-optical device is of the order of 10 centimeters or less. Protective means associated with the optical fibers, the electro-optical device and the internal link serve to protect the components from outside physical disturbance. In another aspect, the electro-optical converter comprises a supporting body which includes a first section adapted to support a source of optical energy and to dissipate heat generated by the source of optical energy, and a second section adapted to support a detector element and to insulate the detector element from the heat generated by the source.

8 Claims, 15 Drawing Sheets

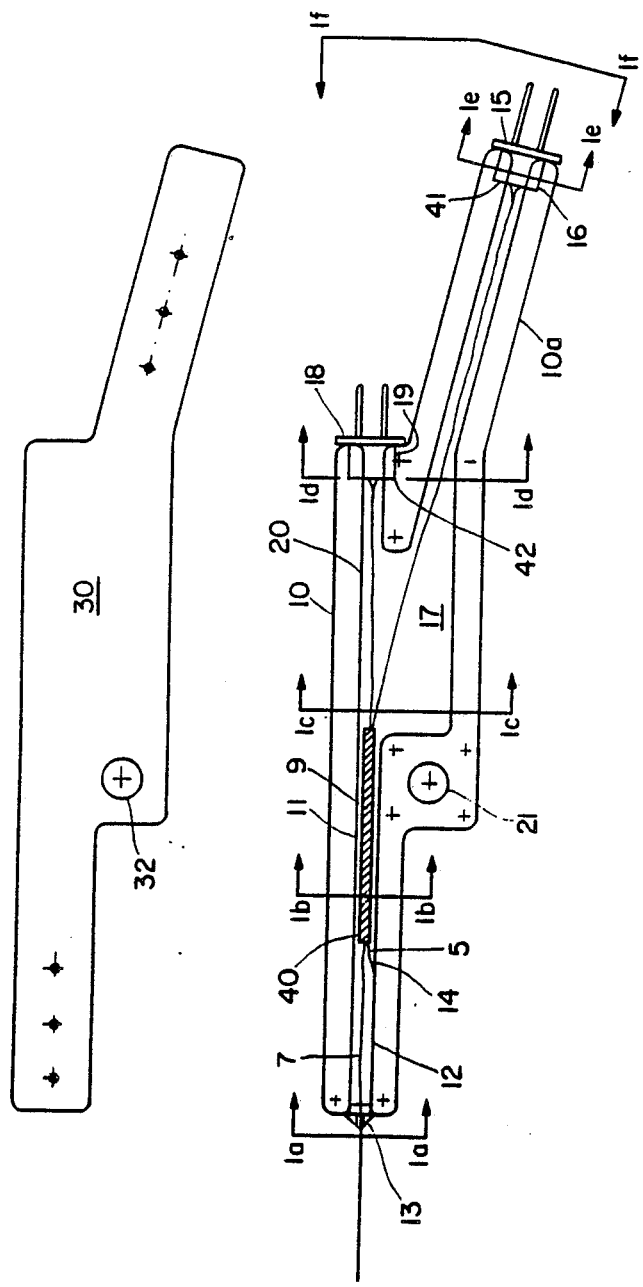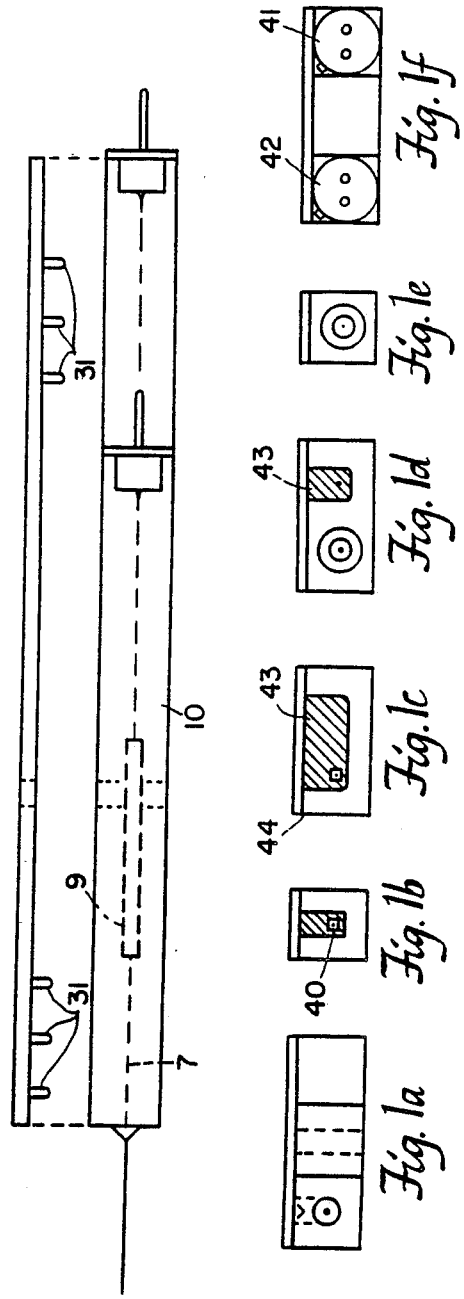

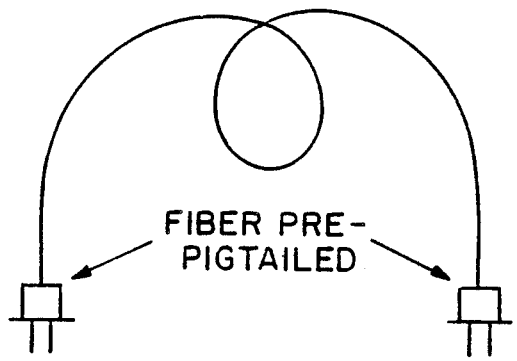
Fig. 17a  FIBER PRE-PIGTAILED
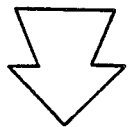
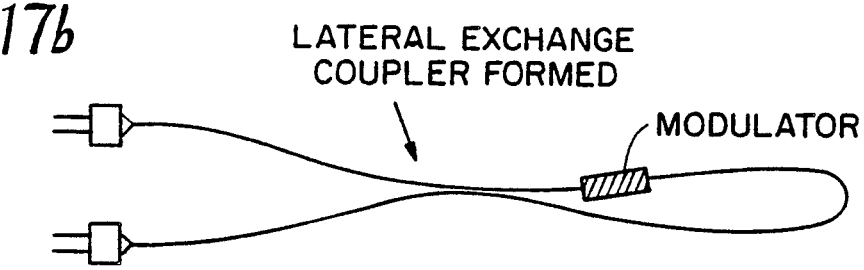
Fig. 17b  LATERAL EXCHANGE COUPLER FORMED — MODULATOR
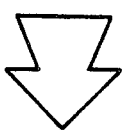
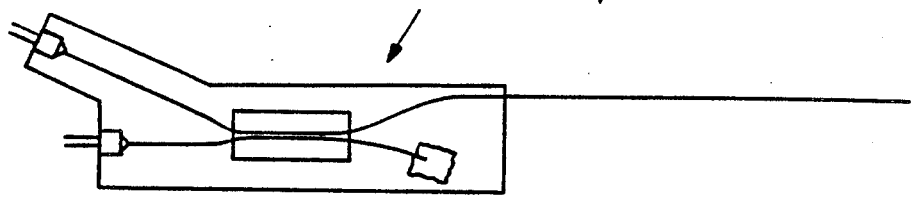
Fig. 17c  PACKAGED, CUT & TERMINATED

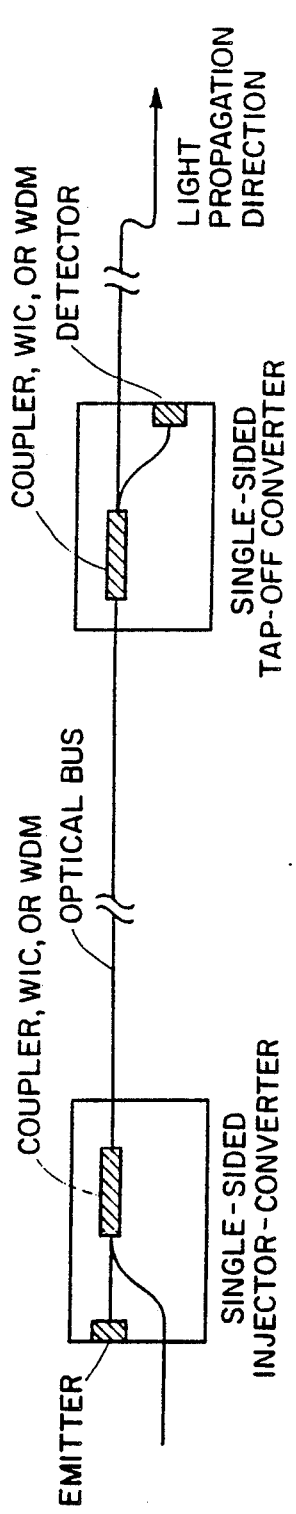
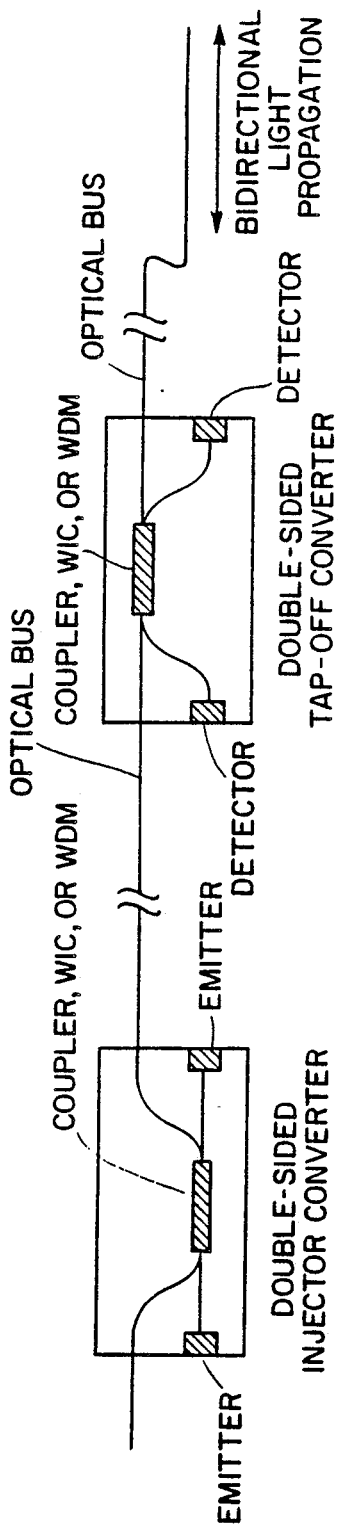
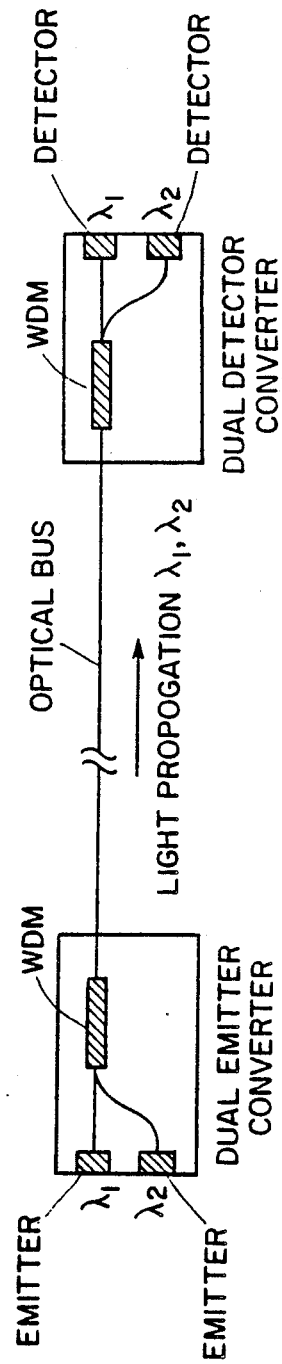
Fig. 23
Fig. 24
Fig. 25

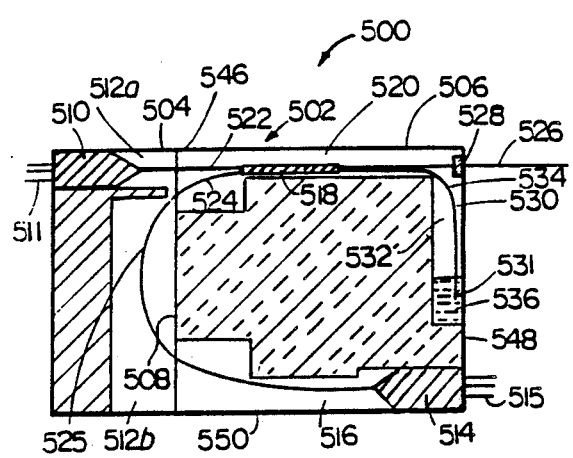
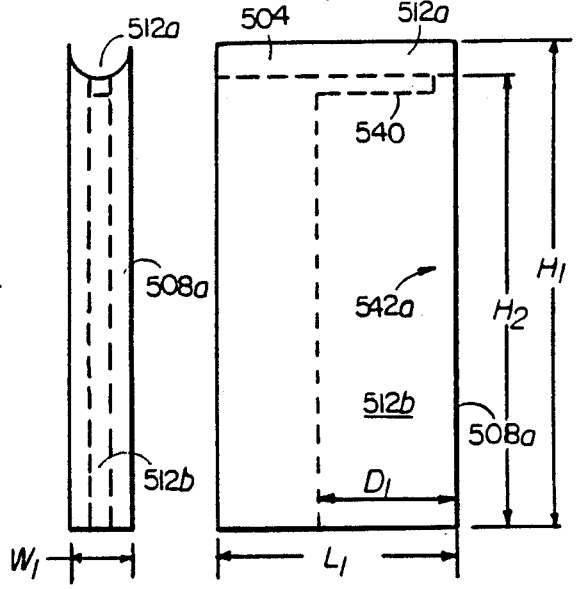
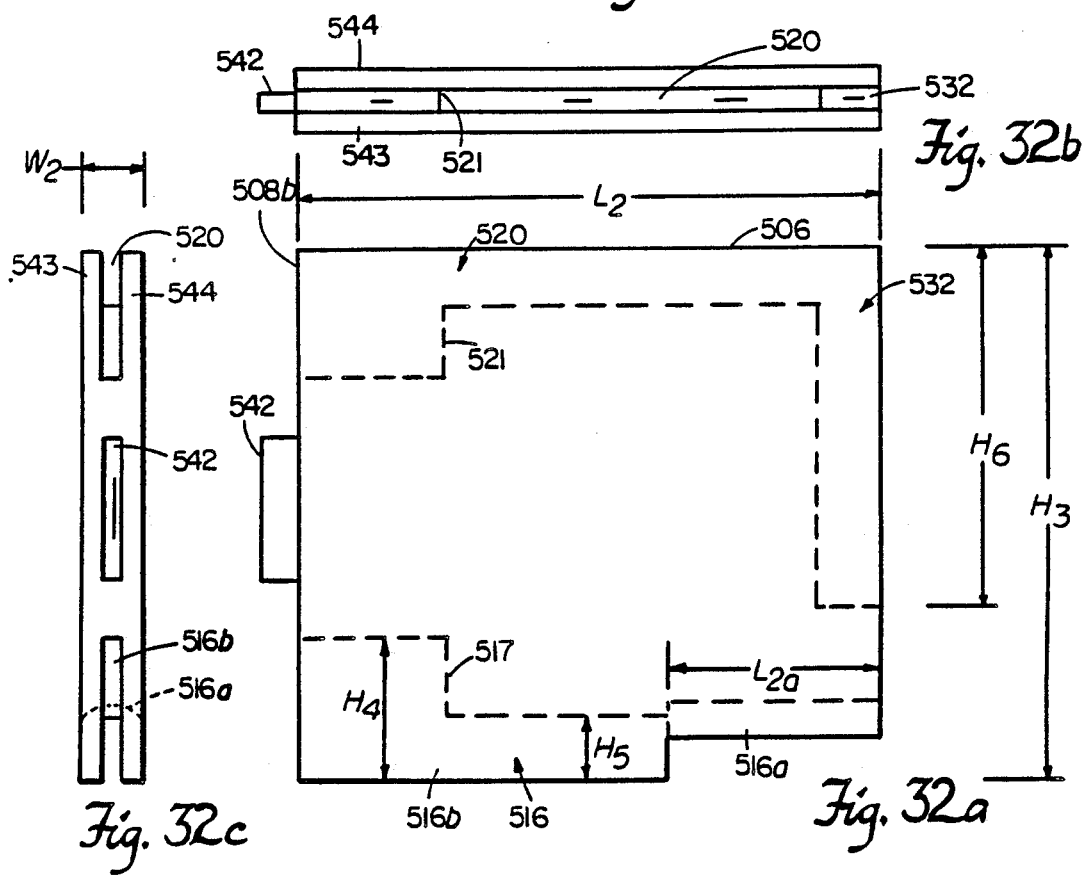

ELECTRO-OPTICAL CONVERTER

INTRODUCTION

This invention relates to electro-optical converters employing fiber-optic components.

BACKGROUND

Electro-optical systems such as fiber communication systems or fiber sensor systems typically require the system builder to connect the small optical fiber to an electro-optical device. This is recognized as a demanding task.

SUMMARY OF INVENTION

The invention features an electro-optical converter having at least three optical or electrical external ports available to the user, at least one of which is optical and one of which is electrical, the converter comprising an essentially rigid support means, a fiber-optic coupler secured to the support means and comprising at least two optical fibers juxtaposed along a portion of their length in a manner to provide lateral transfer of optical energy therebetween, an electro-optical device also secured to the support means in close relationship to the fiber-optic coupler, the device having at least one optical port and at least one electrical port, one of the optical fibers of the coupler communicating within the converter with the optical information port of the electro-optical device, to serve as an internal signal link therebetween, the length of this internal link being of the order of 10 centimeters or less, and protective means associated with the optical fibers, the electro-optical device and the internal link, serving to protect the components from outside physical disturbance.

Preferred embodiments of the invention include the following features. The optical fiber of the electro-optical converter serving as the internal link extends continuously from the coupler to the electro-optical device, i e. without interruption or splice. The electro-optical converter has a multiplicity of electro-optical devices, each secured to the support means in close relationship to the fiber-optic coupler, and each communicating with the coupler over an internal fiber-optic link of length of the order of 10 centimeters or less. In the form of a transceiver, a converter of the invention incorporates at least two electro-optical devices, one of which is an optical emitter and the other of which is an optical detector, both of the electro-optical devices being secured to the support means close to the fiber-optic coupler, a different fiber end of the coupler communicating internally, respectively, with each of the electro-optical devices. In the form of a dual detector, the converter incorporates at least two optical detectors and the converter has at least three external ports comprising at least one optical port and at least two electrical ports. In the form of a dual emitter, the converter incorporates at least two optical emitters and the converter has at least three outputs comprising at least one optical port and at least two electrical ports. The electro-optical converter in a form useful for connecting a bus line with a photo-optic device has at least two external optical fiber ports. In the form of a signal tap off, the converter includes a photo-optic detector as its electro-optical device. In the form of a signal injector, the converter includes a photo-optic emitter as its electro-optical device.

In its broadest aspects the invention encompasses the use of any of the coupler types that achieve lateral transfer of optical energy, e.g. couplers of the etched, polished or fused types.

In certain preferred embodiments, the rigid support is a unified structural element such as a single molding which supports and extends continuously between the coupler and the electro-optical device(s) and the internal fibers extending between coupler and electro-optical device are generally straight or gently curved and of length of 5 centimeters or less. A telephone receiver-transmitter, according to the invention, incorporates the transceiver mentioned above, the electrical output port of the detector of the transceiver being connected to drive a speaker of the telephone set and a microphone of the telephone set being connected to control the emitter of the telephone set.

In preferred embodiments, the optical fiber serving as the internal link extends continuously from the coupler to the electro-optical device; the converter has a multiplicity of electro-optical devices, each secured to the support means in close relationship to the fiber-optic coupler internally, and each communicating with the coupler over a fiber-optic link of length of the order of 10 centimeters or less, preferably, the converter, in the form of a transceiver, incorporates at least two electro-optical devices, one of which is an optical emitter and the other of which is an optical detector, both of the electro-optical devices being secured to the support means close to the fiber-optic coupler, a different end of a fiber of the coupler communicating internally with each of the electro-optical devices, also, preferably, the converter incorporates at least two optical detectors and the converter having at least one optical port and at least two electrical ports, and also, preferably, the converter incorporates at least two optical emitters and the converter having at least one optical port and at least two electrical ports. For connecting a bus line with a photo-optic device, the converter having at least two optical fiber ports, and the converter, in the form of a signal tap off, includes a photo-optic detector as its electro-optical device. In the form of a signal injector, the converter includes a photo-optic emitter as its electro-optical device. A telephone receiver-transmitter incorporates the transceiver described above, the electrical output port of the detector of the transceiver being connected to drive a speaker of the telephone set and a microphone of the telephone set connected to control the emitter of the set.

Advantages of an electro-optical converter constructed according to the invention are that it achieves low optical and electronic cross-talk; it occupies small volume; it controls the configuration (bending) of the internal fiber portions which maintains fiber lifetime within predicted limits; it limits the magnitude of bending attenuation and increases reliability; it enables achievement of hermetic sealing, heat sinking and thermal stability; it is easy to handle and mount and by eliminating the need for the user to separately mount discrete components, it avoids the risk of damage of the fiber that connects the coupler and electro-optical elements. It eliminates the need for the end user to form splices, affix connectors or align detectors or emitters with the fibers, thus avoiding these costly steps that often can introduce losses It. maintains the component orientation which is critical for polarization-maintaining components; it may be implemented to avoid splice loss; it reduces length (and cost) of fiber between the coupler and the opto-electronic components and it protects the components and fibers. It also enables improved performance due to more coupler power, using single or multimode fibers, because a straight (unbent) fiber of short length extending between coupler and the electro-optical device can carry overfilled power for short link distances taking advantage of leaky, cladding, and radiation modes.

The integrated coupler package described above helps to ensure uniformity and stability of performance statistically and over practical production runs and greatly simplifies coupler implementation in fiber-optic systems. As such, the potential applications of couplers are broadened and end users need not be experts in the finer points of fiber-optic design and construction.

This invention thus provides a generalized, highly advantageous technique of packaging evanescent wave couplers (splitters, wavelength division multiplexers and demultiplexers, wavelength-independent couplers, polarization-maintaining couplers, etc.) with active devices (emitters, detectors) and connectors.

Another feature of the invention is an electro-optical converter including a source of optical energy and an element for detecting optical energy, comprising a supporting body which includes a first section adapted to support the source of optical energy and to dissipate heat generated by the source of optical energy, and a second section adapted to support the detector element and to insulate the detector element from the heat generated by the source of optical energy. As a result, the detector element, as well as other optical elements disposed in the second section, is protected from the heat generated by the source. This increases the operating life of the optical components, and also improves the operating performance of the detector element, which should operate at low temperatures for highest accuracy.

Preferred embodiments include the following features. The first section is further adapted to electrically couple the source of optical energy to a reference potential (such as ground potential) and the second section is further adapted to electrically insulate the detector element from the source of optical energy. Thus, the source and detector, which may operate at different bias polarities, are electrically isolated from each other, thereby preventing establishment of an interference-producing electrical ground loop. In addition, the conductive first section attenuates radio frequency radiation produced by the optical energy source. In some embodiments, the first section comprises a metal (such as aluminum) member and the second section comprises a plastic member secured to the metal member. A blade on one of the members fits into the other member to align the first and second members when they are secured together. The blade also imparts mechanical stiffness to the converter. In other embodiments, the first and second sections comprise an integral structure. The source of optical energy may comprise a laser, such as a semiconductor laser.

The invention additionally features a fiber optic coupler disposed in the second section comprising a pair of optical fibers juxtaposed along a length-wise continuous portion of their length in a manner to provide lateral transfer of optical energy therebetween; an end of one of the pair of optical fibers comprises a termination for the coupler, the terminating end having a length extending greater than ¼ inch from the juxtaposed portion of the coupler and being disposed along a bend, with respect to the juxtaposed portion, selected to introduce substantial attenuation to optical energy propagating in the terminating end. The increased length of the terminating end facilitates handling and hence manufacture of the converter. The severe bend introduces a substantial level of attenuation separate from that which normally occurs as a result of light scattering out of the tip of the terminating fiber. Thus, optical isolation between the input of the coupler (fed, for example, by the laser) and the coupled output (applied, for example, to the detector) is improved, and hence crosstalk is reduced.

In preferred embodiments, the tip of the terminating fiber end is disposed in a material having an index of refraction approximately equal to the refractive index of the fiber, thereby introducing additional attenuation and further improving isolation. The material has a predetermined length of between 5 and 10 times the diameter of the core of the optical fiber. Thus, light energy which escapes from the tip of the fiber is diffused in the material, and the amount of light that randomly scatters back into the fiber is reduced due to the length of the material.

Other features and advantages of the invention will be apparent from the following description of the preferred embodiments, and from the claims.

Electro-Optical Converter

BRIEF DESCRIPTION OF DRAWINGS

FIG. 1 is a plan view of an electro-optical converter in the form of a transceiver, with cover removed;

FIG. 2 shows a cover element adapted to be secured to the structure of FIG. 1 for protection of the operating elements;

FIG. 3 is a side view of the converter of FIG. with the covet shown in exploded relationship thereto;

FIGS. 1a, 1b, 1c, 1d, 1e and 1f are views taken on corresponding lines in FIG. 1, with the cover in place;

FIG. 17a, b, and c are diagram illustrating a series of steps in the manufacture of an electro-optical converter;

FIG. 23 is a schematic representation of an optical data link with a single-sided injector/converter and tap-off converter;

FIG. 24 is a schematic representation of a double sided tap off converter on an optical bus with a double sided injector/converter;

FIG. 25 is a schematic representation of a dual wavelength bus system employing a dual emitter and detector converters;

FIG. 30 is a cross-sectional view of an electro-optical converter according to another aspect of the invention with the optical components in place;

FIGS. 31a-31c are side, end and bottom views, respectively, of one section of the converter of FIG. 30; and FIGS. 32a-32c are side, end and bottom views, respectively, of another section of the converter of FIG. 30.

DETAILED DESCRIPTION

Figure 7:
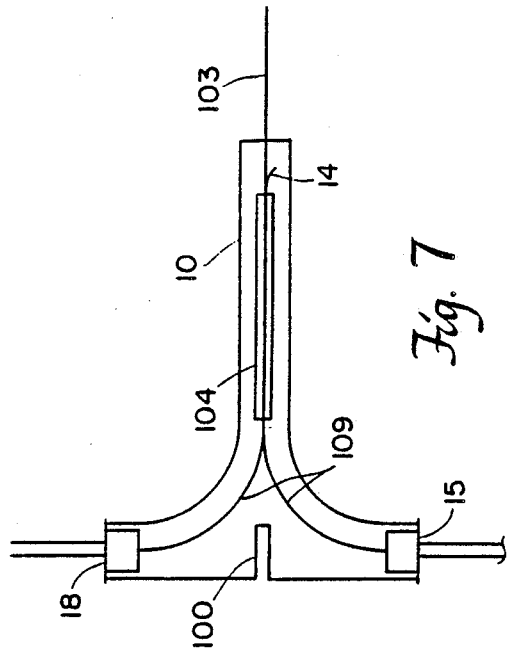
FIGS. 5, 6, 7 and 8 are views similar to FIG. 1 of electro-optical converters, respectively of L-, Y-, T- and D-configuration.

We will now discuss the detailed structure of the electro-optical converter shown in FIGS. 1-4. Elongated support structure base 10 is a filled thermosetting resin which provides rigidity and location of the respective components. An optical coupler 9 is received in narrow channel 11 in base 10. A narrow fiber channel 12 is a continuation of the coupler-receiving channel 11 and extends to the end of the support structure base 10 and provides an outlet channel for the output optical fiber 7. Output fiber strain relief 13 at this port protects the optical fiber from external bending and possible damage. The second fiber 5 leaving the left side of the optical coupler is terminated at a fiber termination 14 which termination provides a means of eliminating any back reflections from that fiber back into the coupler. Back reflection termination is achieved by a ragged end on the optical fiber, index-matching gel, and a light-absorbing material surrounding the gel on the fiber end. Two electro-optical elements are provided in this version of the electro-optical transceiver. The detector 15 is located on a leg 10a of the support structure base which is not colinear with the optical coupler 9 and is mounted in cavity 16 in the support structure base. A widened detector fiber channel 17 provides a clearance for the optical fiber running from the coupler to detector 15. Emitter 18, the second electro-optical component in this electro-optical transceiver, is located colinearly with the optical coupler thus minimizing bending stresses at the emitter fiber interface, secured in the emitter mounting cavity 19 in the support structure base. The emitter fiber channel 20 provides clearance for the optical fiber running from the coupler 9 to the emitter 18 in the support structure base. The support structure mounting hole 21 extends all the way through the base 10 and facilitates mounting of the base to secondary structures. The support structure lid 30 covers the support structure base and seals the coupler and electro-optical components and protects them from external environmental damage. Alignment pins 31 located on the support structure lid penetrate into the support structure base channels to provide alignment of the lid with respect to the support structure base. The mounting hole 32 extends completely through the support structure 30 and is aligned with the similar hole in the support structure base. Adhesive 40 bonds the fiber-optic coupler to the support structure base. Adhesive 41 bonds the electro-optical detector to the support structure base. Adhesive 42 bonds the emitter to the support structure base. Optically absorbing and mechanically damping gel 43 fills all of the remaining channels in the support structure base 10 all the way up to the support structure lid 30 which is bonded to the support structure base with an adhesive 44.

Optically absorbing and mechanically damping gel 43 comprises an ultra-violet light curable silicon rubber base (for example, Optigard TM (X3-6662), manufactured by Dow-Corning Company) that is mixed with 325 mesh (60 micron-120 micron) silicon powder at a concentration of bout 30% by volume. The silicon rubber base material damps vibrations and thus helps protect the electro-optical components from external mechanical disturbances. The silicon powder is highly transmissive of ultra-violet radiation and thus permits the silicon rubber base to be cured by exposure to an ultra-violet light source. The added silicon is also a poor transmission medium for infra-red and visible light. Thus, during the operation of the transceiver, the added silicon in gel 43 absorbs both infra-red light that escapes from the optical elements mounted in base 10 and ambient light which enters the support structure.

Figure 4:
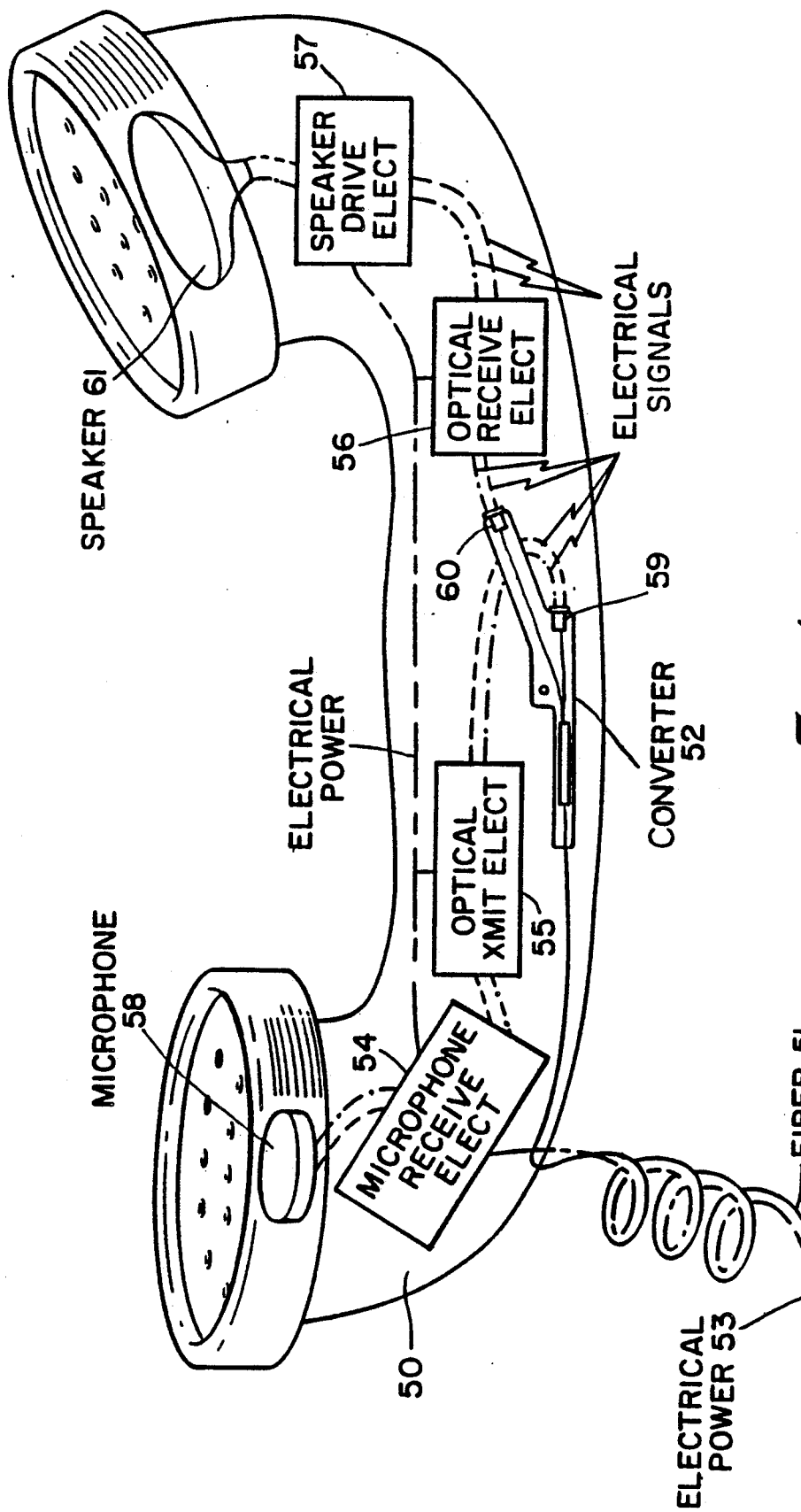
FIG. 4 is a diagrammatic view of a telephone handset employing the transceiver of FIGS. 1-3.

FIG. 4 is a diagrammatic representation of a handset 50 employing the electro-optical converter of FIG. 1, in this case, more specifically, as an electro-optical transceiver 52. The handset 50 is comprised of a molded polymer shell which encases the respective components. The link fiber 51 carries input and output optical information from the handset to the rest of the data transmission system. The electrical power lead 53 provides power to the electrical components within the handset. In particular, the electrical power lead provides power to the microphone receive electronics 54, the optical transmit electronics 55, the optical receive electronics 56 and the speaker drive electronics 57. The microphone receive electronics receives and amplifies signals from the microphone 58. The signals from the microphone receive electronics are then coupled to the optical transmit electronics 55 which provide the electrical drive signal for the electro-optical emitter 59 which converts the electrical signal to a light signal. Optical signals received in the handset from the link fiber are received at the detector 60 located in the converter and are converted to an electrical output. The signal from the detector 60 is processed in the optical receive electronics 56 from which electrical signals are sent to the speaker drive electronics which in turn drives the handset speaker 61.

FIGS. 5-8 show the electro-optical converter in alternative transceiver configurations.

Figure 5:
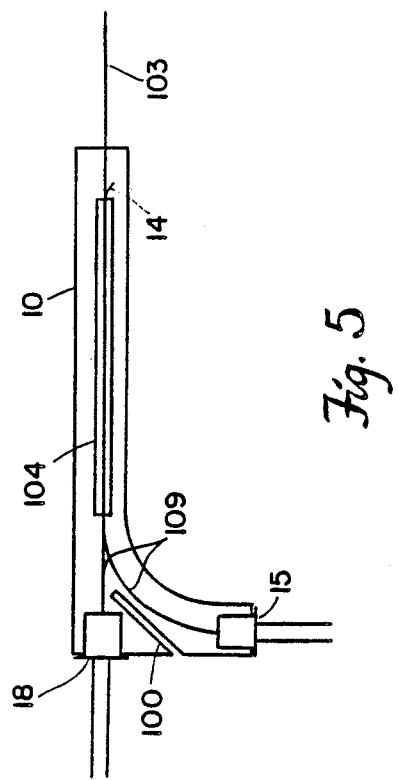

FIG. 5 is an L-configuration which is a minimum package configuration and employs many of the same elements as in the embodiment of FIG. 1. The support structure base 10 holds the coupler 104, the emitter 18, and detector 15. A link fiber 103 exits the coupler package and a fiber end 14 is terminated as in FIG. 1. Internal fibers 109 link the coupler to the emitter and the detector. A slot-like channel 100 is incorporated into the base 10 for isolating optical and electrical field radiation between the emitter and detector.

Figure 6:
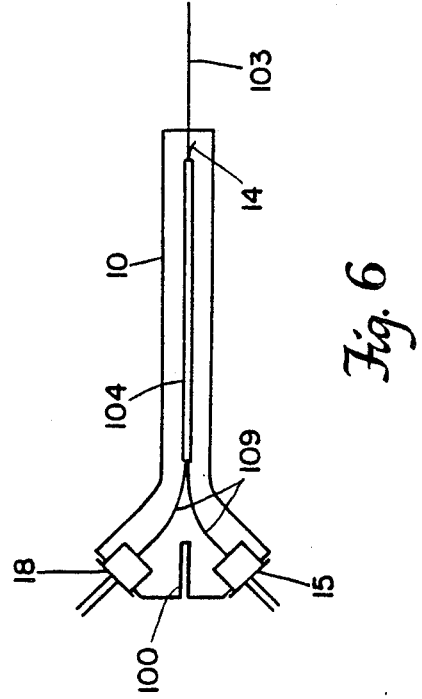

In FIG. 6, the symmetrical Y-configuration of the electro-optical converter transceiver has a Y-shaped support base 10 in which the coupler 104, emitter 18 and detector 15 are mounted. The components are interconnected in the same manner as in FIG. 5. The channel 100 for isolating electro-optical radiation fields between the emitter and detector is placed symmetrically between the two electro-optical components. Internal fiberoptic links 109 may be of equal length in the symmetrical configuration.

In FIG. 7, a symmetrical T-configuration of the transceiver is shown. The components are connected as in FIG. 6 and channel 100 is located midway between the emitter and detector.

Figure 8:
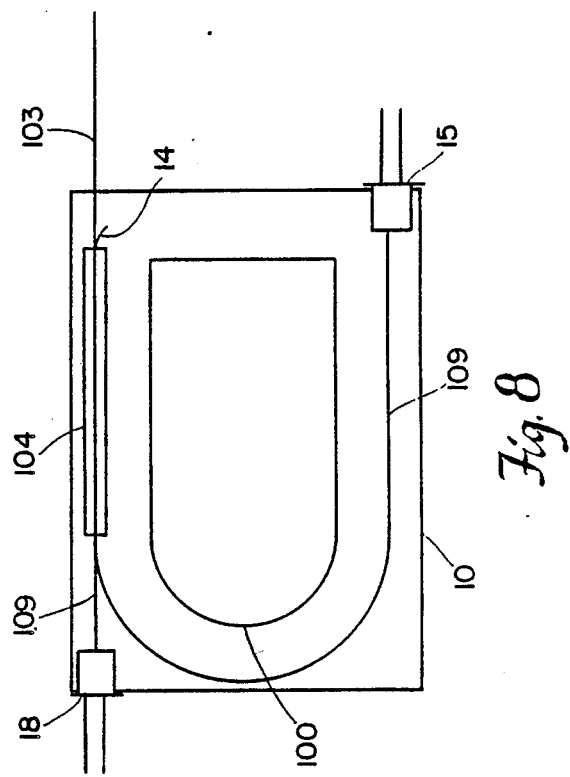

FIG. 8 is a D-configuration whereby the emitter and detector have the largest separation distance for reduced electrical radiation cross-talk between the emitter and detector channels. The emitter 18 is colinear with the coupler 104 and the exiting fiber 103. Fiber links 109 interconnect the emitter 18 and detector 15 to the coupler 104 package. The curved fiber link to the detector 15 in this embodiment is, of course, much longer than the colinear link to emitter 18. The support structure 10 of FIG. 8, besides encasing the components, surrounds the region 100 which is filled or void and provides a means of isolating optical and electrical field radiation between the emitter and the detector.

Figure 9:
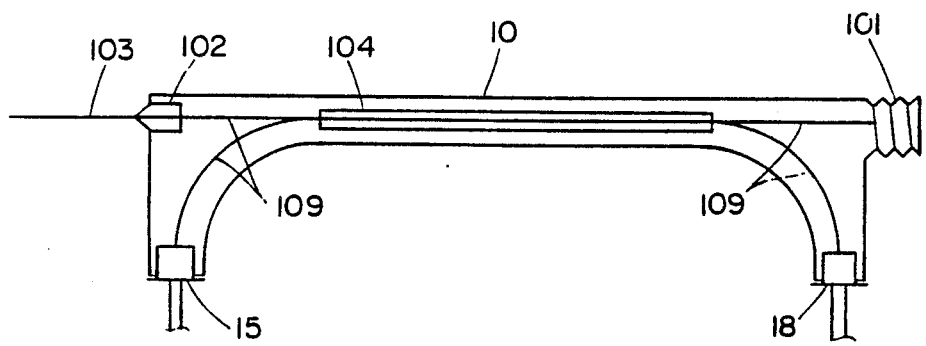
FIG. 9 is similarly a view of an electro-optical converter having colinear configuration of the fiber-optic ports and a transverse relation of the electro-optical elements.

The double-L configuration of FIG. 9 shows another possible implementation of the electro-optical converter. Specifically, a signal tap monitor and emitter signal injector is shown employing some of the many diverse elements which can be configured. The support structure base 10 houses the coupler 104, emitter 15, detector 18, and fiber pigtails 109. Fiber 103 runs colinear with the coupler 104 exits on one side through a plug insert 102 used in place of the electro-optical element. On the opposite end a connector termination 101 is incorporated into the support structure package 10.

Figure 10:
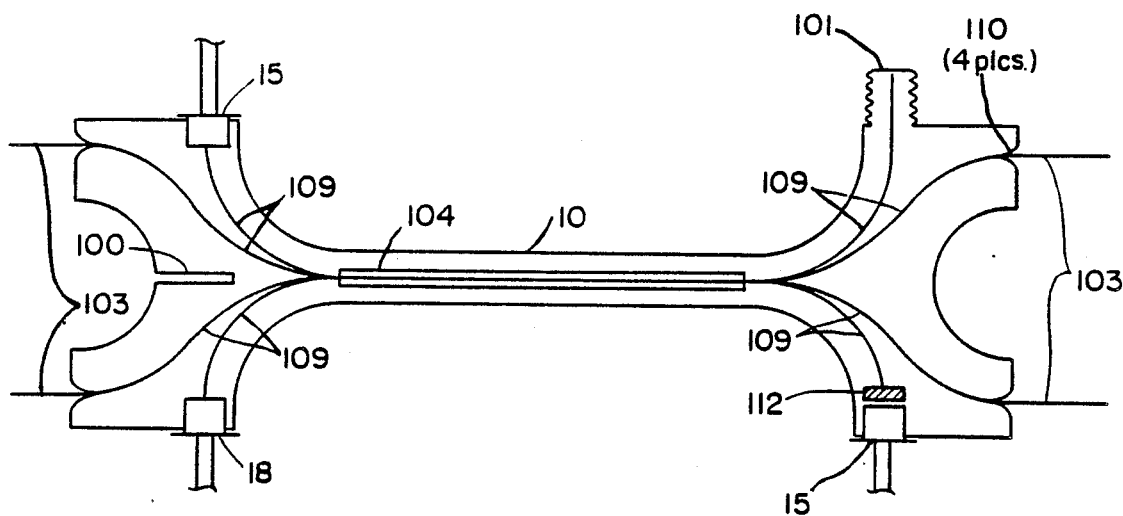
FIG. 10 is a similar view of a four fiber, three electro-optical device, converter with a 4×4 coupler and five optical ports.

FIG. 10 is a electro-optical converter which exhibits a more elaborate double Y-configuration. It incorporates a four-port-by-four port coupler 104 implemented by lateral juxtaposition of four fibers 109. The support structure 10 holds the coupler 104, two detectors 15 and one emitter 18. Five fibers exit the coupler package. One of these fibers is terminated in a connector 101 and four of the fibers 103 exit from respective conical strain reliefs 110 as shown. An optical band pass filter 112 isolates a detector 15 from a signal injected by the emitter 18. The other detector is isolated from optical and electrical field radiation by a channel 100 formed in the base as in the embodiment of FIG. 6.

Figure 11A:
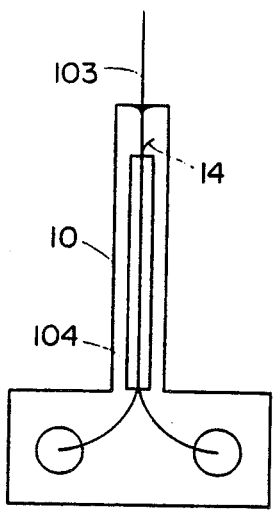
FIG. 11 and 11a show an electro-optical converter having a T-configuration, in which the fibers lie in a different plane than the electro-optical devices.
Figure 11:
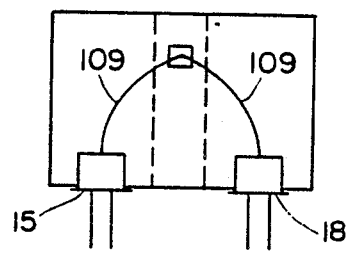

FIG. 11 and 11a show an electro-optical converter and a transceiver configuration whereby the emitter 18 and detector 15 are mounted orthogonally to the coupler 104 in the support structure base 10. The components are electrically and optically interconnected in the same manner as in the embodiment of FIG. 6. However, the fibers interconnecting the coupler and the active electrical devices are bent through a 90 degree rotation in two planes. In this way, a convenient printed circuit board (PCB) mounting is achieved with the emitter and detector plugging directly into the PCB and the fiber exiting orthogonally in a convenient manner.

Figure 12:
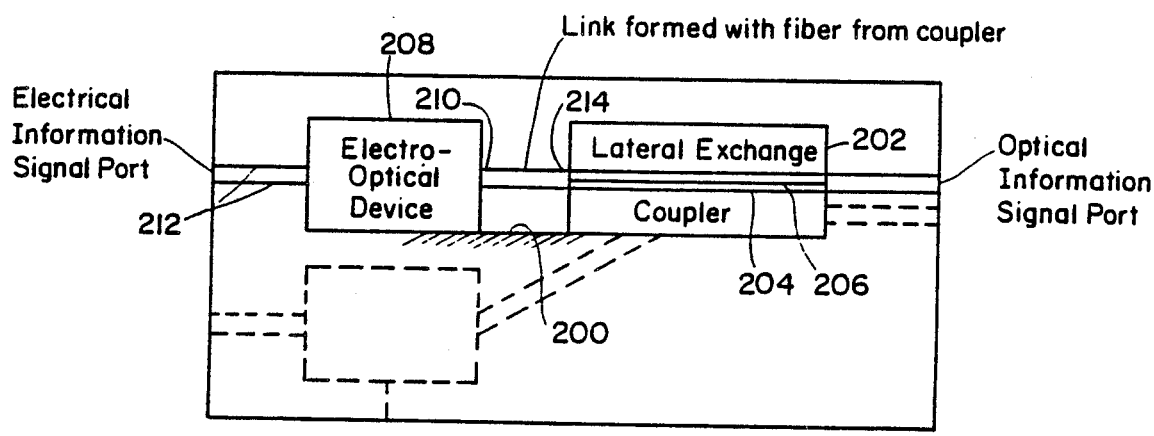
FIG. 12 is a generalized representation of an electro-optical converter illustrating certain of the variations possible according to the invention.

FIG. 12 is a diagrammatic view of an electro-optical converter according to the invention provided to illustrate the generality of certain broad aspects of the invention. The converter includes an essentially rigid support means 200, a fiber-optic coupler 202 secured to the support means and comprising at least two lengthwise continuous optical fibers juxtaposed along a portion of their length in a manner to provide lateral transfer of optical energy therebetween, these fibers being designated 204 and 206. Also secured to support means 200 is an electro-optical device 208 disposed in close relationship to the fiber-optic coupler, this device having at least one optical information port 210 and at least one electrical information port 212. One of the optical fibers 214 of the coupler communicates with the optical information port 210 of the electro-optical device to serve as a data link therebetween. The length of this link, between the coupler and the electro-optical device, is of the order of 10 cm or less. Protective means, for instance gel 43 surrounding the link, the coupler and the electro-optical device, and a cover, not shown, serve to protect the components from outside physical disturbance. In addition to the single optical information port and electrical information signal port illustrated in solid lines in FIG. 12, one additional port is provided to the outside, either an optical port from one of the other fibers of the coupler or an electrical port associated with a second electro-optical device incorporated in the converter, and connected to the coupler by the dashed lines shown. Indeed, it is within the broadest aspects of the invention to incorporate additional electro-optical devices and a coupler with more than two fibers, or additional couplers in the same unitary converter.

Further, important aspects of the invention deal with the nature of the particular components suggested in FIG. 12. The lateral exchange coupler 202 can be comprised of a coupler with any of a number of particular characteristics. The preferred embodiment for the electro-optical transceiver shown in FIG. 1 utilizes a lateral exchange coupler fabricated from single mode optical fiber in the form of a 2×2 evanescent wave coupler or diffused biconical tapered leg.

Figure 13:
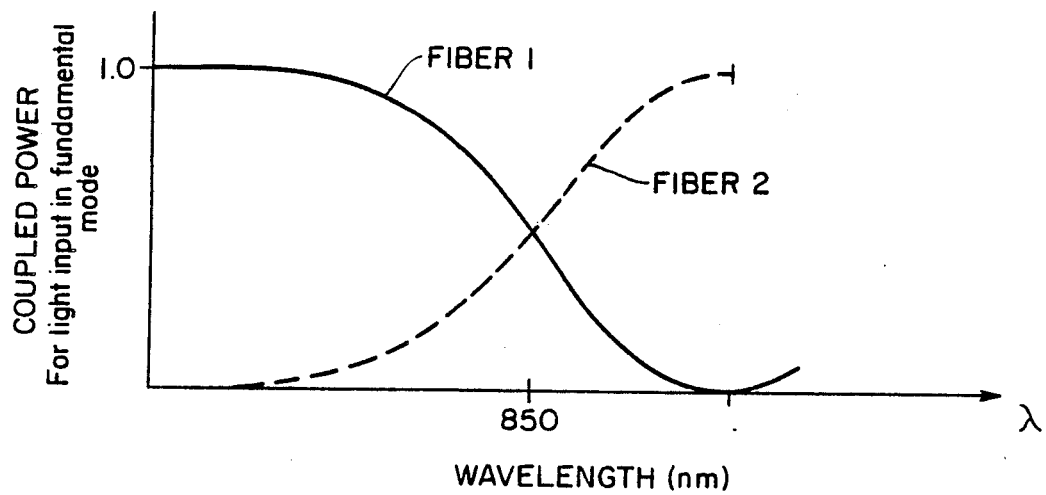
FIG. 13 is a graph of coupled power vs wave length for a 2×2 evanescent wave coupler made according to FIG. 1.

The optical power emitted by the two output legs of such a 2×2 single mode coupler are shown in FIG. 13. Fiber 1 designates the optical power in the throughput fiber and fiber 2 represents the power evanescently coupled in the 2×2 coupler. The coupler power is shown for a loss less coupler as a function of wavelength with a 50/50 coupling ratio shown at a wavelength of 850 nanometers. At wavelengths shorter than 850 nanometers, less and less optical power is coupled from fiber 1 to fiber 2. At 850 nanometers in a 50/50 coupler half of the output light is carried by fiber 1 and half is carried by fiber 2. At wavelengths longer than 850 nanometers, in this example, more than 50% of the light is carried by fiber 2 and less is carried by fiber 1. The key feature of the 2×2 fused coupler is that the coupling ratio is intentionally controlled only at one precise wavelength during the fabrication of the coupler. The coupling ratio can be measured at other wavelengths, but in general, the coupling ratio at other wavelengths is not constrained to any preferred value. And thus the coupling ratio at wavelengths other than the design wavelength will tend to vary because of variations in diameters of the original fibers, heated length of the fused region as the fiber is drawn, differences in the initial diameter of the fiber before drawing and differences in the refractive index properties of the fiber.

Figure 14:
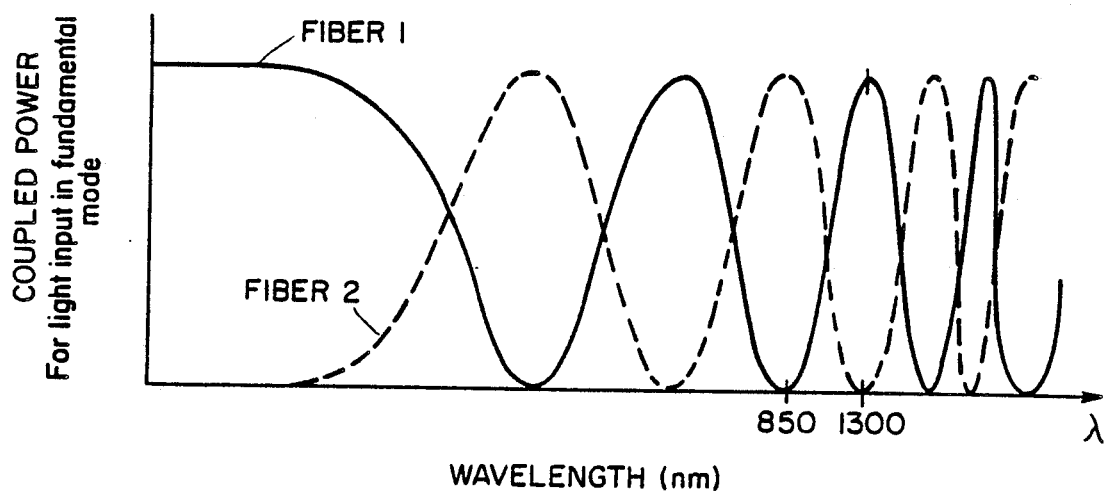
FIG. 14 is a graph of a coupled power vs wave length for a wave length division multiplexing (WDM) coupler made according to FIG. 1.

In another preferred embodiment a wavelength division multiplexing coupler (WDM) is utilized as the lateral exchange coupler 202 in the electro-optical transceiver shown in FIG. 12. In the WDM coupler, the coupling ratio of the coupler is fabricated so as to control the coupling ratio at two or more design wavelengths. In the most common embodiment of the WDM, one wavelength or wavelength band is chosen so as to have a zero percentage of the light in the input fiber coupled to the cross-coupled fiber 2 such as is illustrated by a wavelength of 1300 nanometers in FIG. 14. At the same time the coupler is designed to provide 100% coupling of light from fiber 1 to fiber 2 for a wavelength at 850 nanometers as shown in FIG. 14.

Techniques for independently controlling the coupling ratio at two more wavelengths are well known to those skilled in the art such as described in a reference to be provided. Utilization of the WDM lateral exchange coupler in the preferred transceiver embodiment enables the user to more easily discriminate between light propagating inward toward the transceiver on the fiber-optic link and light traveling outward from the transceiver along the fiber-optic link, thus to some extent minimizing optical cross-talk between light propagating in either direction on the link. Utilization of the WDM also allows more efficient use of the available optical energy by sending essentially all light of a particular wavelength to the desired electro-optic component.

Another preferred embodiment of the electro-optical converter is that a WDM used as a lateral exchange coupler can be used to combine the light from two separate electro-optical emitters, each operating at a different wavelength. In this embodiment the light output along the fiber-optic link contains light of two different wavelengths.

In another complementary preferred embodiment, the WDM can be used as a lateral exchange coupler in the electro-optical converter with optical electronic detectors sensitive to two different wavelengths of light present within the converter. This device functions as a demultiplexer in which light entering the converter along the fiber-optic link is split into optical signals by the WDM with a different wavelength of light propagating to each of the two respective photoelectric detectors.

In another form of the preferred embodiment, the optical fibers comprising the coupler, the fiber-optic link and the fiber links to the optical components may be single mode fiber such as commonly used for communications fiber. Other fiber types may also be used such as multi-mode optical fibers or polarization maintaining optical fibers, plastic optical fibers or plastic-clad glass optical fibers or any other specialty optical fibers capable of propagating light in the fibers. The invention also includes the electro-optical converter in which the optical fiber leading from the lateral exchange coupler 202 to the electro-optical device 208 or devices (e.g., emitter 18 or electro-optical detector 15) components may be spliced through fusion splicing or mechanical splicing so as to connect the device. Furthermore, the optical fiber comprising the lateral exchange coupler need not be similar or identical to the optical fiber pigtailed to the electro-optical devices.

Another fiber-optic lateral exchange coupler 2 which may be used in the preferred embodiment of the electro-optical transceiver is the wavelength independent coupler or WIC. The characteristic performance of a WIC is shown schematically in FIG. 15 in which the coupling ratio is plotted as a function of wavelength. The WIC is fabricated in such a fashion that the coupling ratio only varies gradually over a wavelength band of operation.

Figure 15:
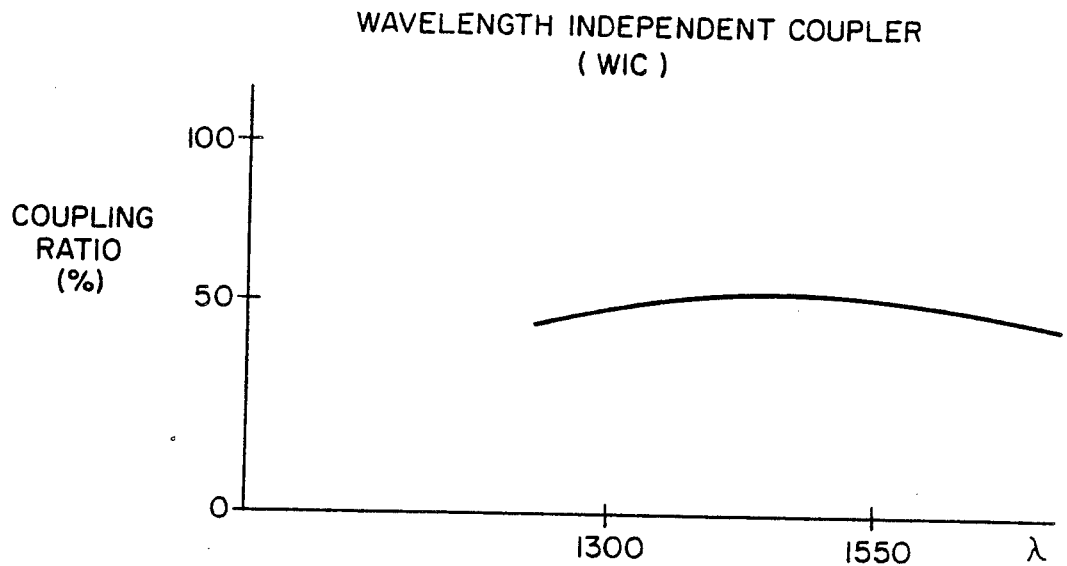
FIG. 15 is a graph of coupling ratio vs. wave length for a wave length independent coupler (WIC) made according to FIG. 1.

In FIG. 15 the desired coupling ratio of 50% is precisely achieved at the operational wavelengths of 1300 nanometers and 1550 nanometers and the coupling ratio only varies gradually for other wavelengths between these two design wavelengths. The utilization of a WIC as a lateral exchange coupler of the unit provides the advantage that an emitter at either of the design wavelengths or anywhere in the operational wavelength band of the WIC may be used while achieving nominally the same performance of the electro-optical converter.

Another preferred embodiment of the electro-optical converter consists of the utilization of fiber-optic connectors 101. In this embodiment the fiber-optic connector may be used to replace any port in which the optical fiber from the lateral exchange coupler would otherwise emerge from the converter, joining with the fiber-optic link fiber.

In the preferred connector embodiment the fiber 1 or any or all of the fibers which normally would pass from the coupler to the link are terminated instead in a fiber-optic connector 101. The connector may be joined via a fiber to the lateral exchange coupler by a continuous fiber or by fibers which have been mechanically or fusion spliced, or the connector and lateral exchange coupler fiber may also be of different construction or character.

The lateral exchange coupler is a fiber-optic coupler secured to the electro-optical converter support means and comprising at least two optical fibers juxtaposed along a portion of their length in a manner to provide lateral transfer of optical energy therebetween. Such lateral exchange couplers can be fabricated using a variety of techniques such as etched couplers potted in a material with suitable refractive index or etched fused; unetched fused; both with or without additional potting. Other alternatives are polished couplers, fused polished couplers, polished couplers with suitable material or fluid such as refractive index gel or oil sandwiched between the two or more lengthwise continuous couplers. The lateral exchange couplers may achieve coupling through evanescent wave coupling or overlap in which the two or more cores of the two or more lengthwise continuous optical fibers are in close optical contact, thus allowing light from one core to propagate directly to an adjacent core. The lateral exchange couplers may also achieve coupling through bending or any other form of mode conversion which enables energy to be exchanged between the cores of the two or more optical fibers in the region where the fibers are lengthwise continuous.

A variety of electro-optical elements may be used in the electro-optical converter. In one preferred embodiment the electro-optical element may be comprised of an optical emitter. Optical emitters of any available optical wavelength are included within this invention. The optical emitter may be a laser diode, a light-emitting diode, a white light source or incandescent light source, or a superluminescent diode Although emitters which are cylindrical in shape are shown in the preferred embodiment, emitters of any shape or package are included within this invention.

Another electro-optical device covered within this invention is the optical detector. Optical detectors may be fabricated using silicon technology, germanium technology, or any other technology which is amenable to usage with optical fibers. Detectors of any shape or package are included within the invention.

Another electro-optical element included within this invention is the fiber-optic switch in which there is at least one input optical fiber and at least one output optical fiber, the amount of light passed from input to output optical fiber being controlled by at least one electrical control signal.

Another electro-optical device covered under this invention is comprised of an electro-optical modulator in which there is at least one input optical fiber and one output optical fiber and at least one electrical control signal such that the intensity, phase or polarization of the output optical light wave relative to the input optical light wave is modulated.

Any or all of the aforementioned electro-optical devices may include electronics encapsulated within the electro-optical housing or wired to the electro-optical device.

Another electro-optical device included within this invention is the electro-optical filter in which there is at least one input optical fiber, and one or more output ports which may be either electrical or optical, such that the output response from the electro-optical filter is controlled by an electronic control signal and is related in some known fashion to the wavelength of the light input along the input optical fiber.

In addition to electro-optical devices and couplers which have been presented as important examples of the electro-optical converter, the invention also comprises other passive optical elements or passive electro-optical elements suitably located with respect to the coupler and electro-optical devices. One such passive optical device may be a wavelength selective optical filter deposited on the end of the fiber leading to the photodetector or as a discrete element located between the fiber end and the photodetector as in element 112 of FIG. 10. Such a filter may be located elsewhere in the system as desired, such as at the output optical port of the transceiver. One such passive electro-optical element may be an optical isolator located between the electro-optic emitter and coupler so as to reduce back reflection from entering the transmitter or as located at any other suitable location within the converter.

Figure 16:
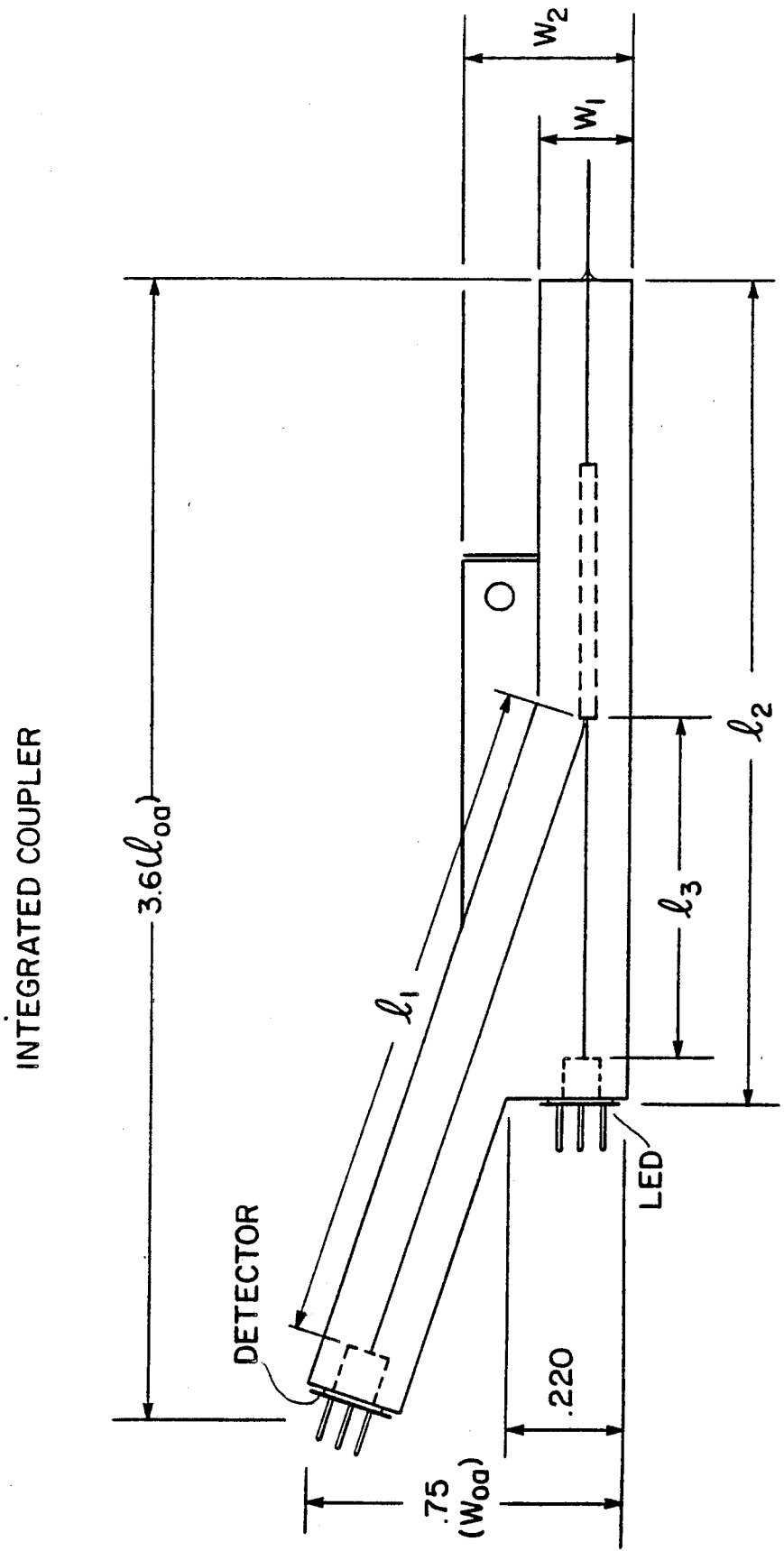
FIG. 16 is a view of an optical transceiver with designation of certain dimensions.

FIG. 16 illustrates the significant dimensions of the preferred optical transceiver of FIG. 1. The dimensions shown in FIG. 16 are the distance $l_1$ between the detector and the coupler which is approximately $1\frac{1}{2}$ inches, the distance $l_3$ between emitter and the coupler which is $\frac{3}{4}$ inch, the distance $l_2$ from the emitter to the exit port of the fiber which is $2\frac{1}{2}$ inches and the overall length $l_{0A}$ which is 3.6 inches. The width of the transceiver at the exit region of the fiber is given as $w_1$ which is about $\frac{1}{4}$ inch, the width $w_2$ which is the width up to the mounting hole is $\frac{1}{2}$ inch, and the overall width $w_{0A}$ is $\frac{3}{4}$ inch.

FIG. 17 shows the preferred method of fabrication. In this technique the active electronic components are pre-pigtailed to a length of fiber via conventional alignment and bonding techniques 17a. Next, the coupler is formed on the loop of fiber minimizing the distance between the active electro-optic components and the coupler. This distance is typically less than 2 cm. This is shown in FIG. 17b. This construction has the advantage that the emitter and detector used in the transceiver are the very same emitter and detector used to fabricate the coupler used in the transceiver, thus providing improved accuracy, reliability and performance. In order to measure the coupler parameter accurately, a modulator may be used to provide a nonreciprocal phase shift as shown in FIG. 17b. Finally, the combined electronic devices and the coupler are packaged, and the unused fiber is terminated in index matching gel. The used optical port leaves the package or is terminated in a connector.

Figure 18:
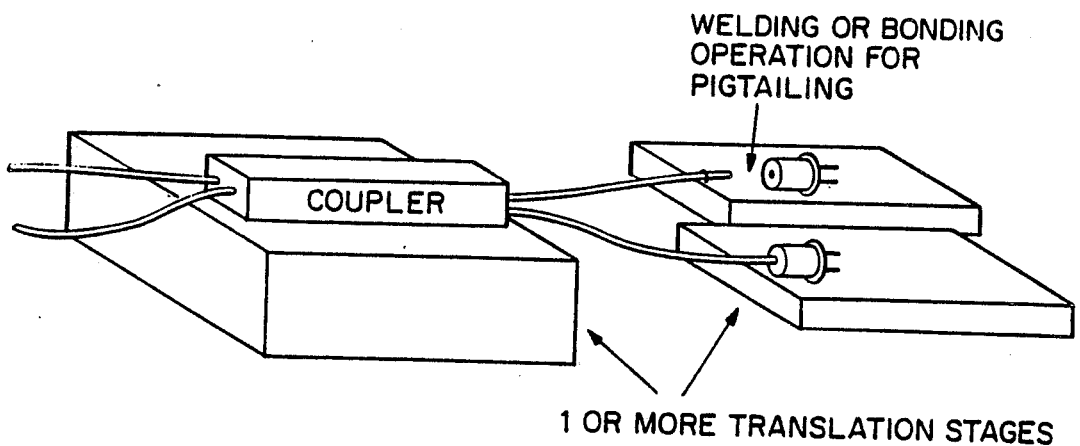
FIGS. 18 and 19 illustrate alternative steps in forming the coupler.

A second preferred method of fabrication is given in FIG. 18. In this technique for pigtailing electro-optical devices to the coupler, the coupler is preformed and the active electro-optical devices are separately translated into position to form the fiber-to-electrical device alignment. Then a welding and bonding operation is performed on these pigtails, and the final product is removed and packaged into the housing.

Figure 19:
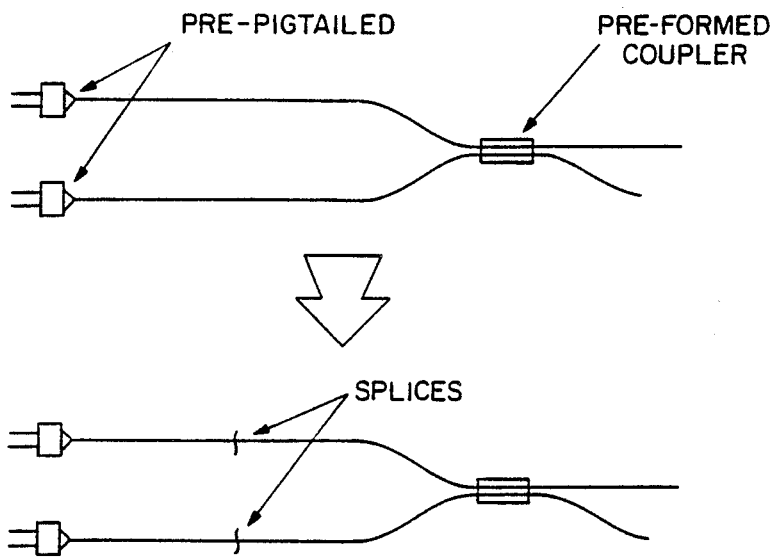

The last preferred method of fabricating shown in FIG. 19 relies on fusion splicing prepigtailed electro-optical devices with a preformed coupler. Bare sections of fiber are brought into close proximity in a fusion splicer, and the splices are performed. The remaining assemblage is then packaged into the housing. One problem with this method is that typical splicing equipment available today requires more than 15 cm as the final distance between the coupler and electro-optical devices.

Figure 20A:
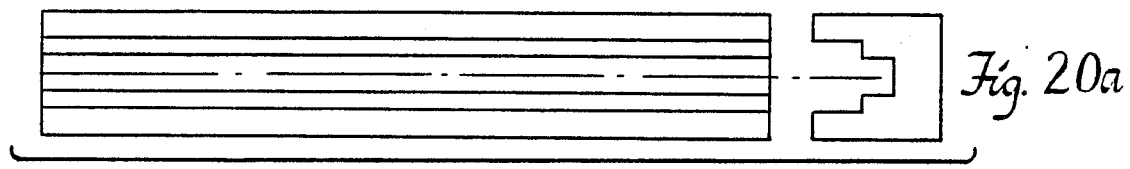
FIG. 20a, 20b and 20c are plan views of basic component modules for fabricating a variety of electro-optical converters.
Figure 20B:
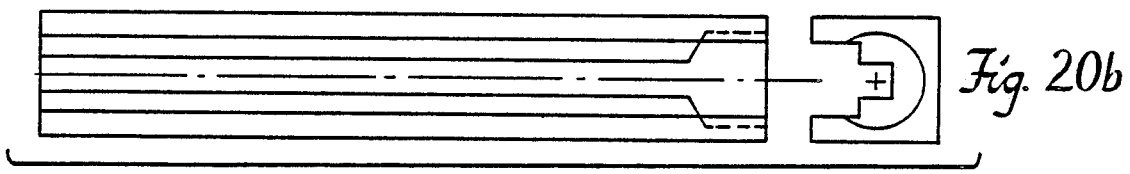
Figure 20C:
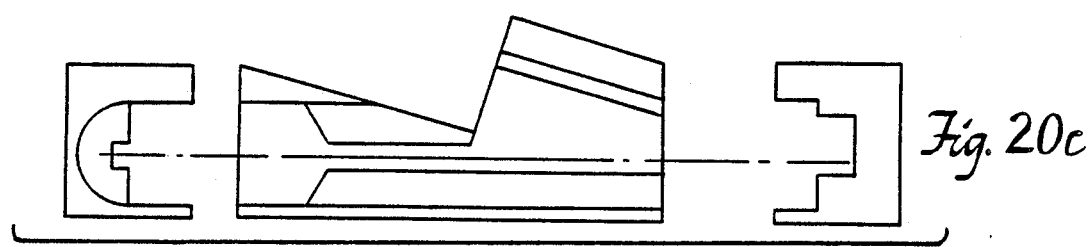

FIG. 20 shows the three basic modules which make up a building block technique for fabricating the package. FIG. 20a is a straight-through interconnection module. FIG. 20b is a straight-through interconnection module with a cutout for holding active electrical devices. FIG. 20c is an interconnection module which holds an active device and will interconnect between members of FIG. 20a, b or c.

Figure 21:
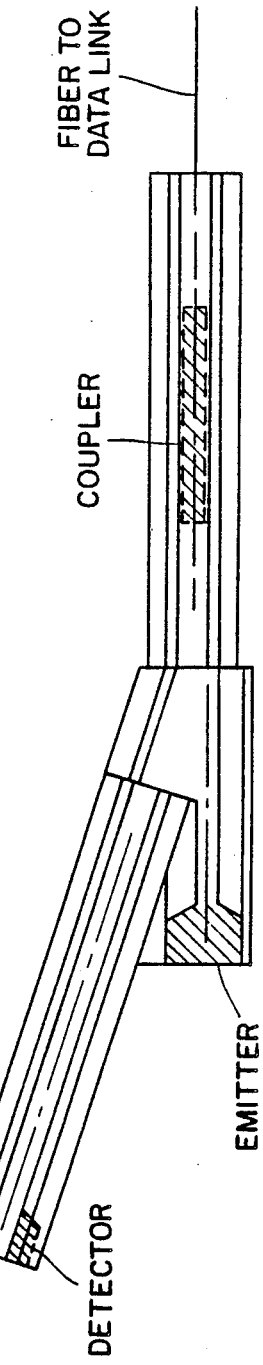
FIG. 21 is a plan view of a simple transceiver composed of the basic component modules.

FIG. 21 shows a simple modular transceiver employing the basic building modules. The emitter has been placed in the module shown in FIG. 20c, the detector has placed in the module of FIG. 20b and the coupler has been placed in module of FIG. 20a. These modules are next bonded together to form a complete package. In FIG. 21 the fiber exits the coupler into the data link.

Figure 22:
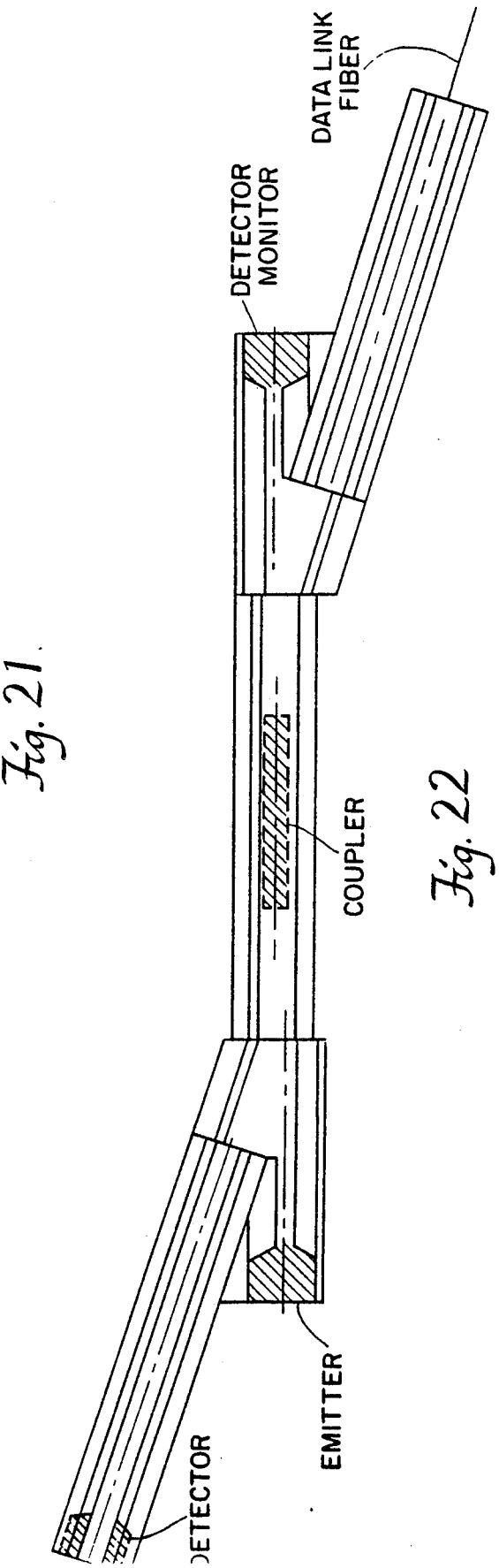
FIG. 22 is a plan view of a modular electro-optical converter with detector monitoring of the emitter.

FIG. 22 is a modular electro-optical converter with a detector monitoring the emitter. In this application the component modules are arranged to form a transceiver with a detector monitor looking at one of the output fibers of the coupler; the other output fiber of the coupler proceeds onto a data link. It is very apparent that these basic building modules can be employed in a great number of permutations to create a variety of optical configurations.

The embodiment shown in FIG. 23 consists of an optical data link with a single-sided injector/converter on one side and a single-sided tap-off converter on the other side. The single sided injector/converter consists of a throughput optical data bus fiber with an emitter which couples onto the optical data bus fiber in the injector converter with a coupling efficiency determined by the coupling ratio of the laterally coupled WIC or WDM within the converter. The single-sided tap-off converter is comprised of a throughput optical data bus fiber with a tap-off detector, the fraction of optical power tapped off being determined by the coupling ratio of the lateral WIC or WDM. Components of the laterally coupled devices can be either of the 2×2 coupled nature WIC or WDM couplers with wavelength selective properties.

FIG. 24 shows a double-sided tap-off converter on an optical bus with a double-sided injector converter Light from the optical data bus enters the double-sided injector converter, passes through the laterally coupled device and passes out to the optical data bus on the other side. Two emitters in the electro-optical converter on either side of the laterally coupled element inject additional optical signals at predetermined wavelengths onto the optical bus in both directions. The double-sided tap-off converter receives optical energy from the optical data bus from either side of the link, the laterally coupled element in the electro-optical converter selectively sends the desired optical information to photoelectric detectors on either side of the laterally coupled element. By appropriately selecting the laterally coupling element as a WIC or WDM, desired wavelength selective properties may be achieved.

FIG. 25 shows a dual wavelength optical data bus system comprised of a dual emitter converter and a dual detector converter. The dual emitter converter consists of two emitters on one side of the lateral mode coupler. In this embodiment each emitter operates at a different wavelength $\lambda_1$ and $\lambda_2$ and the lateral mode coupler is chosen to be a WDM of suitable property such that both wavelengths $\lambda_1$ and $\lambda_2$ are combined efficiently onto the single bus fiber propagating toward the dual detector converter. The dual detector converter consists of an optical input from the optical bus fiber which enters a suitably chosen lateral mode coupler consisting of a WDM with properties such that light of wavelengths $\lambda_1$ and $\lambda_2$ is directed toward detectors which are respectively sensitive to light at those wavelengths. With this type of link it is possible to send twice as much information over a single fiber by using two different wavelengths. Alternatively, such a dual wavelength system has the advantage of carrying more information with relatively simple electronic demodulation of the information by having much of the information deciphered or partially sorted by being carried at two different wavelengths.

Figures 26, 27:
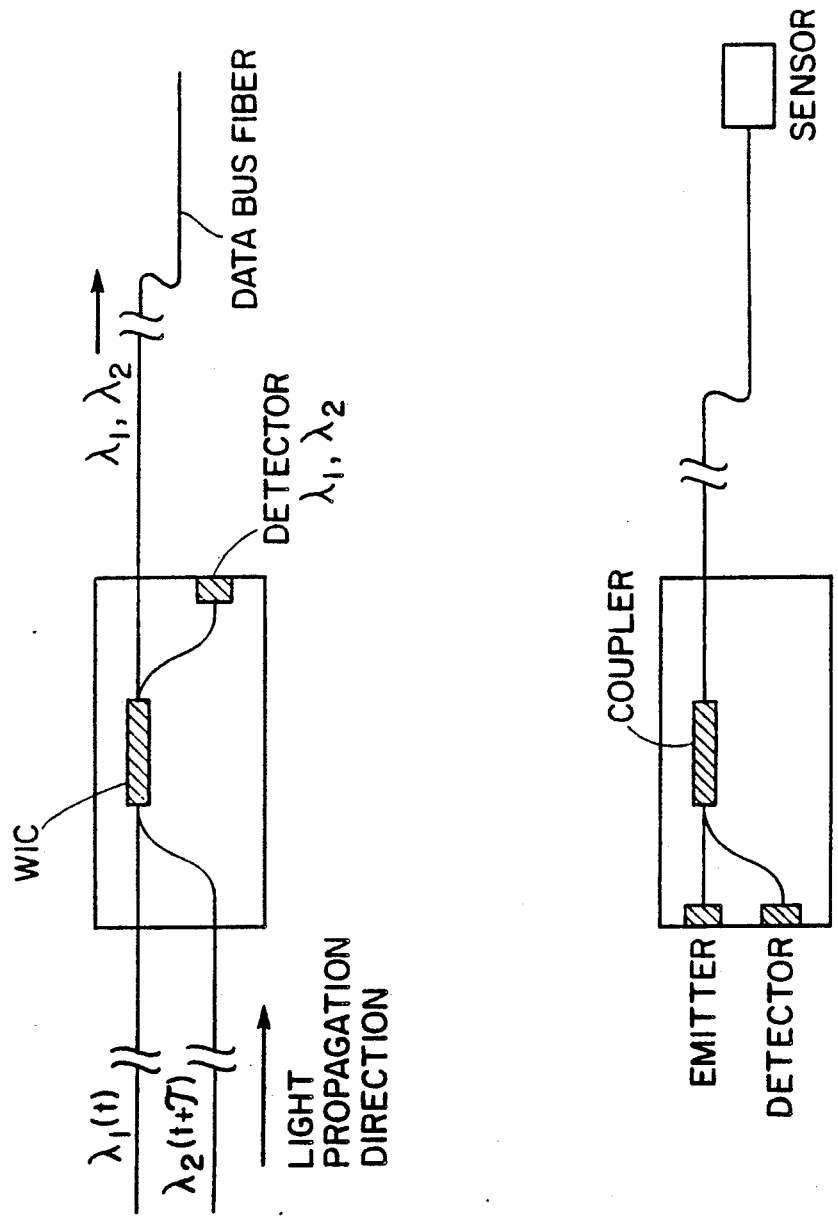
FIG. 26 is a schematic representation of an electro-optical converter for introducing light of different wavelengths into a single fiber.
FIG. 27 is a schematic representation of an electro-optical converter for simultaneously powering and detecting the output of a sensor via a single fiber link.

FIG. 26 shows an electro-optical converter, utilizing a WIC for combining light of different wavelengths carried by each of two different fibers and outputting it onto one optical data bus fiber with a detector or monitor for determining the total optical power. In this case two independent data bus fibers enter the converter, each carrying light at different wavelengths comprised of wavelength $\lambda_1$ and $\lambda_2$. The WIC comprising the lateral mode coupled element in the converter couples each wavelength uniformly so that a known percentage of the light is coupled into the detectors and the remaining known percentage of light is combined onto the data bus fiber.

FIG. 27 shows an embodiment of a fiber-optic sensor system in which the electro-optical converter is an essential element in optically powering a remote sensor element and optically monitoring the return from the sensor. In this embodiment the emitter in the converter passes light through the evanescent wave coupler, some of which light emanates from the converter and propagates down the data link to the sensor head. The sensor returns light whose properties are proportional to or some known function of an environmental parameter being sensed. The return light propagates backward through the same fiber and enters the converter where it passes through the coupler, and a fraction of the return light is coupled into the detector. The detector monitors the intensity of the return light beam and provides an electrical output which in most cases is ideally proportional to the received intensity. In this embodiment multi-mode fiber or single-mode fiber may be preferred depending upon the characteristics of the optical sensor and the data link. As is obvious to one skilled in the art, transceivers or electro-optical converters can be combined or concatenated with a sensor system in such a way that a wavelength selective sensor can be implemented in which one wavelength is a reference wavelength propagating to the sensor, and a second wavelength constitutes a signal wavelength from the sensor which is modulated by the sensor as a function of the environmental parameter being measured.

Figure 28:
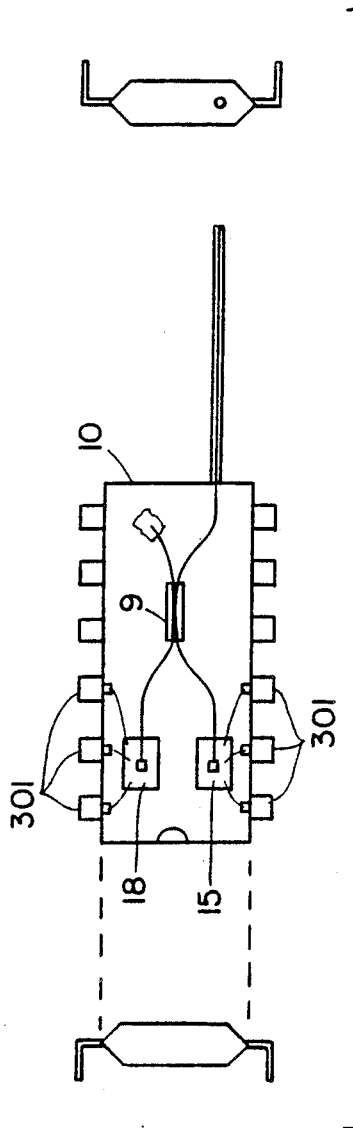
FIG. 28 is a schematic representation of a dual in line transceiver package.

In FIG. 28, the unitary converter is shown in a transceiver configuration where the support structure base 10 is a dual in line package similar to that available with standard electronic components. The emitter 18 and detector 15 are prefabricated chips which are wire bonded to electrical leads 301. The emitter 18 emits and detector 15 detects in a transverse direction with respect to the mounting plane of the dual-in-line package, and both devices couple to a coupler 9. The system is functionally the same as FIG. 1.

Figure 29:
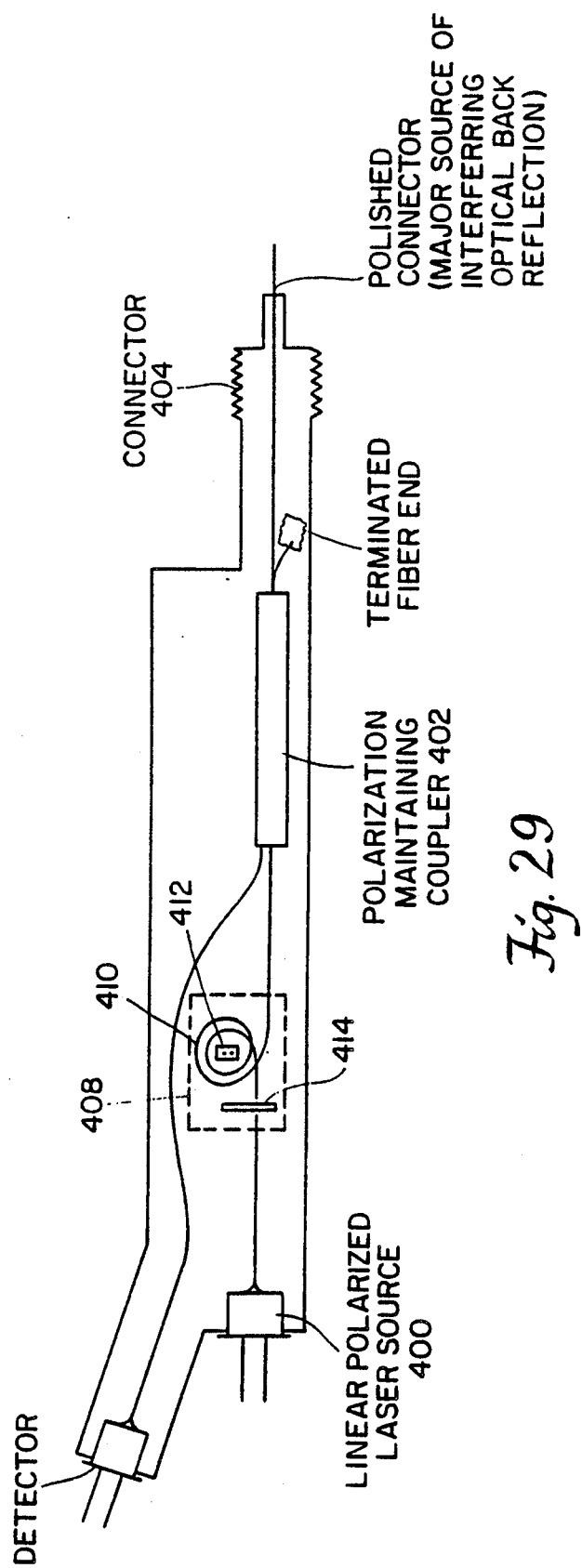
FIG. 29 is a schematic representation of a unitary electro-optical transceiver employing an isolator.

In FIG. 29 there is shown a unitary electro-optical converter in which the output of a linear polarized laser source 400 is directed through a polarization maintaining coupler 402.

A fiber which extends from the opposite side of the coupler is terminated at a polished connector 404. An optical isolator 408 is provided along the fiber that leads from the laser source to the coupler 402. As shown this isolator consists of a multi-turn coil 410 formed in the fiber, a permanent magnet, 412, and a linear polarizing filter element 414.

Principles of such an isolator and other types of isolators are found in description of microwave devices employing Faraday rotation, because the mathematical theory holds for fiberoptic isolators. An example of the latter is found in T. Findakly, "Single-mode Fiber Isolator in Toroidal Configuration", *Applied Optics*, Dec. 1, 1981, Vol 20, No. 23, pp. 3989, 3990. Another type that may be used is the bulk optic isolator which relies upon the principle of a polarizer and a quarter wave plate, see *Optics Guide 2*, Melles Griot Handbook, republished 1982 A microminiature system based on this principle can be employed with optic fiber.

Referring to FIG. 30, electro-optical converter 500 comprises a base 502 which includes a relatively thermally and electrically conductive section 504, such as an aluminum member, secured to a relatively thermally and electrically nonconductive section 506 (such as a member made from a commercially available plastic such as Nylon 66) along a seam 508. A semiconductor laser 510 (for example, a commercially available 1300 nanometer laser), packaged in a conical can, is received in a cylindrical chamber 512a in conductive section 04. An optical energy detector 514 (for example, a commercially available 70 micron diameter indium gallium arsenide (InGaAs) detector) is disposed in a chamber 516 in nonconductive section 506.

An optical coupler 518 is received in a chamber 520 of section 506 and is secured therein by epoxy. Optical coupler 518 comprises a pair of single mode optical fibers juxtaposed along the length of coupler 518 to provide lateral energy transfer between the pair of fibers. A first end 522 of one of the pair of optical fibers, disposed on the left side of coupler 518 in FIG. 30, lies in chambers 520, 512a and is connected to the optical output port of laser 510. A first end 524 of the other fiber, also protruding from the left side of coupler 518 in FIG. 30, extends along a gradual bend region 525 through chamber 520, a chamber 512b in section 504, and chamber 516, and is connected to the optical input port of detector 514.

From the right side of coupler 518 protrudes a second end 526 of the first optical fiber, which passes through chamber 520 to an external device (such as another transceiver, not shown) via strain relief 528 (epoxied within chamber 520) which protects optical fiber 526 from external bending and possible damage. A second end 530 of the second optical fiber also projects from the right side of coupler 518 and is disposed in chamber 532 through a severe bend region 534. The tip 531 of fiber end 530 is disposed within a mass 536 of a gel or a clear epoxy, which has approximately the same index of refraction as that of the core of optical fiber end 530. The depth of mass 536 in chamber 532 is comparatively long, about 5 to 10 core diameters.

Referring to FIGS. 31a–31c, three views of a preferred embodiment of section 504 are shown with the optical components removed therefrom. As can be seen, section 504 comprises a member having chambers 512a, 512b formed therein by any suitable method, such as by grinding. Member 504 has a height, $H_1$, of 1.66 inches and a length, $L_1$, of 0.8 inches. The thickness, $W_1$ of member 502 is 0.22 inches, and chamber 512a is a cylindical groove 0.22 inches in diameter. Chamber 512b is a channel 0.063 inches wide formed in the center of the width ($W_1$) of surface 18a. Thus, a pair of walls 538, 539 enclose chamber 512b. Chamber 512b has a height ($H_2$) of 1.5 inches and extends to a depth ($D_1$) of 0.45 inches into member 504. A shelf 540, 0.05 inches in thickness, abuts chambers 512a, 512b to provide support for laser 510 and also to provide isolation between optical fiber ends 522, 524 (FIG. 30). Shelf 540 terminates behind surface 508a (by 0.05 inches) and thus chambers 512a, 512b are in communication within member 504.

Referring to FIGS. 32a–32c, section 506 is preferably a single molded plastic member having chambers 516, 520, 532 formed during molding. Member has a total height ($H_3$) of 1.66 inches, and thus the front surface 508b of member 506 matches the height of surface 508a of member 504. Member 506 has an overall length ($L_2$) of 2.0 inches, which is also the depth of chambers 516, 520. The thickness ($W_2$) of member 506 is 0.22 inches. A rearward portion 516a of chamber 516 is formed as a semicylindrical passage in member 506 with a diameter of 0.22 inches and a length ($L_{2a}$) of 0.8 inches to receive detector element 514 (FIG. 30). The forward portion 516b of channel 516 comprises a groove having a width selected to match that of chamber 512b. Chamber portion 516b has a height ($H_4$) adjacent surface 508b of 0.45 inches, which decreases (at step 517) 0.5 inches rearward of surface 508b to a height ($H_5$) of 0.2 inches. The stepped height of chamber 516b accommodates bend region 525 of optical fiber end 524 (FIG. 30).

Likewise, chamber 520 comprises a channel having a width matching that of chamber 512b. Thus, a pair of walls 543, 544 enclose chambers 516b, 520. The height of chamber 520 steps from 0.45 inches to 0.2 inches at step 521 (disposed 0.5 inches rearward of front surface 508b), also to accommodate optical fiber bend region 525. A blade 542 is disposed on front surface 508b. Blade 542 has a width matching that of chamber 512b to fit within an insert region 542a thereof (FIG. 31a) and thereby laterally align chambers 516b, 520 with chamber 512b and provide mechanical stiffness to converter assembly 500.

Termination chamber 532 is also a 0.063 inch channel and is disposed in the rearward region of section 506. Chamber 532 has a height ($H_6$) of 1.1 inches and a width of 0.2 inches, and is laterally aligned with chamber 520 and disposed orthogonally with respect thereto. As with chambers 516b, 520, walls 543, 544 enclose termination chamber 532.

Converter 500 is assembled by placing coupler 518 within chamber 520 and laser 510 and detector 514 within chambers 512a, 516a, respectively. Laser 510 and detector 514 are preferably "prepigtailed" to optical fiber ends 32, 34, respectively. Sections 504, 506 are then brought together and epoxied along surfaces 508a, 508b.

Then, laser 510 and detector 514 are epoxied in chambers 512a, 516a, respectively, and coupler 518 is cemented in chamber 520. Laser 510 is cemented using a thermally conductive adhesive (such as epoxy filled with metal or aluminum oxide particulates). The left side of coupler 518 (in FIG. 30) is spaced from the optical output port of laser 510 by less than 0.95 inches (2.4 cm) and extends slightly to the left of step 521. Thus, bend in region 525 though the stepped portion of chamber 520, chamber 512b, and the stepped portion of chamber 516b to detector 514. The apex of bend region 525 extends nearly the entire depth of chamber 512b. Thus, the bend of optical fiber end 524 is sufficiently gradual to introduce very little mechanical stress on optical fiber end 524, which promotes long-term life.

Optical fiber end 530 is then cut to have a substantial length, such as 1.25 inches, and therefore is easily manually manipulated through severe bend region 534 and placed in terminating channel 532. The tip 531 of optical fiber end 530 is then immersed in the index matching gel 536.

Next, an optically absorbing and mechanically damping gel is injected into chambers 512a, 512b, 516, 520, and 532 to help protect the optical components from mechanical stresses during operation and from external environmental damage. Covers (not shown) are then cemented on surfaces 546, 548, 550 (FIG. 30) to encase the optical components in chambers 512a, 512b, 516, 520, and 532.

In operation, laser 510 responds to electrical signals coupled thereto via leads 511 to produce single-wavelength optical energy in optical fiber end 522. The output light is split in coupler 518, with one portion (such as half) of the power of the output light being coupled into optical fiber end 526, and a second portion of the output beam being coupled to terminating optical fiber end 530. The light in fiber 526 propogates to a terminal device (such as another converter 500). The energy returned to converter 500, via optical fiber 526, is split by coupler 518 into optical fiber ends 522, 524. The light returned to optical fiber 522 couples to laser 510 with little effect. The light coupled to optical fiber end 524 propagates to detector 514 through gradual bend region 525 with substantially no loss due to the large arc defined by the bend region. The signal is detected and amplified in detector 514, and electrical signals representative of the detected light energy are applied to a utilization device (not shown) via leads 515.

The portion of the output of laser 510 which is coupled into terminating optical fiber end 530 propagates through bend region 534, which is selected to be sufficiently severe to introduce "bend loss" by causing the light to escape from the core of fiber end 530 into the cladding and buffer (typically, a plastic or silicon rubber material) of the fiber end, thereby attenuating the light (such as by 15 dB). The light that escapes from fiber tip 531 and enters matching gel 536 is no longer constrained by the core of optical fiber end 530, and thus is dispersed and diffused in index matching gel 536. Because of the long path length of gel 536, the amount of light that randomly scatters back into the core of fiber end 530 for return to coupler 518 is significantly reduced (such as by another 50 dB). As the light propagates in fiber end 530 toward coupler 518, a second bend loss is introduced by severe bend region 534. Thus, the light energy returned to coupler 518 is significantly attenuated (such as by a total of 80 dB), producing a high level of isolation between the input of detector 514 and the output of laser 510, thereby reducing optical cross-talk between the laser and detector.

Aluminum member 504 provides an effective heat sink for laser 510, and also provides an electrical path through which laser 510 is coupled to a reference potential (such as ground). Further, because member 504 is electrically conductive, it creates eddy current effects which counteract and attenuate radio frequency radiation produced by laser 510. Plastic member 506 thermally insulates detector 514 and coupler 518 from the heat generated by laser 510 and also electrically insulates the laser and detector (which typically operate at different bias polarities) from each other.

As discussed, laser 510 and detector 514 are preferably "prepigtailed"; that is, laser 510 and detector 514 are supplied with optical fiber ends 522, 524, respectively, preterminated at the optical ports thereof. Thus, maximum optical coupling is achieved between laser 510 and fiber end 522 and between fiber end 524 and detector 514. Coupler 518 is fabricated (i.e., drawn) by stripping selected lengths of the buffers of the optical fibers at locations corresponding to the selected location of coupler 518 on each fiber. The glass cores of the fibers are then etched and drawn together to provide coupler 518 with a predetermined coupling ratio.

Other embodiments are within the scope of claims.

For example, coupler 500 may alternatively be fabricated as a unitary combination of sections 504, 506, such as by injection molding sections 504, 506 as a single structure in a two-part mold. The same base plastic would be used in the regions of the mold corresponding to sections 504, 506. However, the base plastic would be combined with a glass fill to form the relatively non-thermally and non-electrically conductive section 506, and would be filled with a relatively thermally and electrically conductive material (such as graphite) in section 504.

We claim:

1. An electro-optical converter including a source of optical energy and an element for detecting optical energy, comprising a supporting body which includes:
    a first section adapted to support the source of optical energy and to dissipate heat generated by the source of optical energy, and
    a second section adapted to support the element for detecting optical energy and to insulate the element from the heat generated by the source of optical energy,
    wherein said second section comprises a fiber optic coupler disposed in said second section, said fiber optic coupler comprising a pair of optical fibers juxtaposed along a length-wise continuous portion of their length in a manner to provide lateral transfer of optical energy therebetween, an end of one of the pair of optical fibers comprising a termination for said coupler, said terminating end having a length extending greater than ¼ inch from the juxtaposed portion of said coupler and being disposed along a bend, with respect to said juxtaposed portion of said coupler, selected to introduce substantial attenuation to optical energy propagating in said terminating end.

2. The electro-optical converter of claim 1 wherein a tip of said terminating end is disposed in a material in said second section having an index of refraction approximately equal to the refractive index of the optical fiber.

3. The converter or claim 2 wherein said material has a predetermined length between 5 and 10 times the diameter of the core of said optical fiber.

4. An electro-optical converter having at least three optical or electrical ports at least one of which is optical and one of which is electrical, said converter comprising
    an essentially rigid support means including a first section adapted to support a source of optical energy and to dissipate heat generated by the source of optical energy, and a second section adapted to support an element for detecting optical energy and to insulate the element from the heat generated by the source of optical energy, said detector element having at least one optical port and at least one electrical port,
    a fiber-optic lateral coupler secured to said second section and comprising at least two optical fibers juxtaposed along a length-wise continuous portion of their length in a manner to provide lateral transfer of optical energy therebetween,
    one of said optical fibers of said coupler communicating within the converter with the optical port of said detector element to serve as an internal signal link therebetween,
    the length of said link between said coupler and said detector element being of the order of 10 centimeters or less, and
    protective means associated with said optical fibers, said detector element, and the internal link, serving to protect said components from outside physical disturbance.

5. An electro-optical converter including a source of optical energy and an element for detecting optical energy, comprising a supporting body which includes
    a first section adapted to support the source of optical energy and to dissipate heat generated by the source of optical energy, and
    a second section adapted to support the element for detecting optical energy and to insulate the element from the heat generated by the source of optical energy,
    wherein said first section is further adapted to electrically couple the source of optical energy to a reference potential and said second section is further adapted to electrically insulate the element for detecting optical energy from the source of optical energy, and wherein said first section comprises a first member comprising a metal and said second section comprises a second member comprising a plastic material, said first and second members being adapted to be secured together.

6. The converter of claim 5 wherein one of said first and second members comprises a blade adapted to be disposed in a chamber disposed in the other one of the first and second members when the first and second members are secured together, thereby to align the first and second members.

7. The converter of claim 5 wherein the source of optical energy is a laser.

8. The converter of claim 7 wherein said laser is a semiconductor laser.

* * * * *